United States Patent
Fu et al.

(10) Patent No.: US 12,358,827 B2
(45) Date of Patent: Jul. 15, 2025

(54) 3D GLASS-CERAMIC ARTICLES AND METHODS FOR MAKING THE SAME

(71) Applicant: CORNING INCORPORATED, Corning, NY (US)

(72) Inventors: Qiang Fu, Painted Post, NY (US); Rohit Rai, Painted Post, NY (US); John Richard Ridge, Hammondsport, NY (US); Ljerka Ukrainczyk, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 313 days.

(21) Appl. No.: 17/101,408

(22) Filed: Nov. 23, 2020

(65) Prior Publication Data

US 2021/0155524 A1     May 27, 2021

Related U.S. Application Data

(60) Provisional application No. 62/940,523, filed on Nov. 26, 2019.

(51) Int. Cl.
    *C03B 32/02*      (2006.01)
    *C03C 1/02*      (2006.01)
    *C03C 10/00*      (2006.01)

(52) U.S. Cl.
CPC ............ *C03B 32/02* (2013.01); *C03C 1/026* (2013.01); *C03C 10/0027* (2013.01); *C03C 10/0054* (2013.01)

(58) Field of Classification Search
None
See application file for complete search history.

(56) References Cited

U.S. PATENT DOCUMENTS

| | | |
|---|---|---|
| 8,713,968 B2 | 5/2014 | Keebler et al. |
| 8,854,623 B2 | 10/2014 | Fontaine et al. |

(Continued)

FOREIGN PATENT DOCUMENTS

| | | | |
|---|---|---|---|
| CN | 108264218 A | * | 7/2018 |
| CN | 109231804 A | | 1/2019 |

(Continued)

OTHER PUBLICATIONS

JP2007284319A Machine Translation—Clarivate Analytics—Performed Mar. 23, 2023. (Year: 2023).*

(Continued)

*Primary Examiner* — Lisa L Herring

(57) ABSTRACT

Methods of forming a glass-ceramic article, the method are provided. Embodiments of the method may include initially nucleating a precursor glass composition at a first nucleation temperature and maintaining the first nucleation temperature for a pre-nucleating time period to produce a pre-nucleated crystallizable glass composition, wherein the pre-nucleated crystallizable glass composition comprises 5 wt % to 20 wt % crystalline phase ASTM C1365-18, forming the pre-nucleated crystallizable glass composition into an initial 3D shape; further nucleating the initial 3D shape for a nucleating time period to a second nucleation temperature to produce a nucleated crystallizable glass composition; and ceramming the nucleated crystallizable glass composition to a crystallization temperature and maintaining the ceramming temperature for a crystallization time period to produce the glass-ceramic article. The glass-ceramic article may have a final 3D shape is within 0.1 mm of the original design specifications.

18 Claims, 10 Drawing Sheets

(56) References Cited

U.S. PATENT DOCUMENTS

| | | | |
|---|---|---|---|
| 9,512,029 | B2 | 12/2016 | Ehemann et al. |
| 9,701,573 | B2 | 7/2017 | Beall et al. |
| 10,611,666 | B2 | 4/2020 | Jones et al. |
| 2016/0031736 | A1* | 2/2016 | Muehlke ............ C03B 23/0307 428/172 |
| 2016/0102010 | A1* | 4/2016 | Beall .................... C03C 21/002 501/4 |
| 2019/0169061 | A1* | 6/2019 | Jones ....................... H05K 5/03 |
| 2020/0115267 | A1 | 4/2020 | Li et al. |
| 2020/0180992 | A1* | 6/2020 | Rai ......................... C03B 32/02 |
| 2020/0239354 | A1* | 7/2020 | Li .......................... C03C 21/002 |
| 2020/0346969 | A1* | 11/2020 | Li ............................ C03C 21/00 |
| 2021/0024406 | A1 | 1/2021 | Christiansen et al. |
| 2021/0139362 | A1* | 5/2021 | Nozaki ................... C03C 3/087 |

FOREIGN PATENT DOCUMENTS

| | | | | |
|---|---|---|---|---|
| CN | 109369021 | A | 2/2019 | |
| JP | 2007284319 | A * | 11/2007 | ............ C03B 19/09 |
| TW | 201943670 | A | 11/2019 | |
| WO | 2017/223561 | A1 | 12/2017 | |
| WO | 2019/022034 | A1 | 1/2019 | |
| WO | 2019/160436 | A1 | 8/2019 | |
| WO | 2020/018309 | A2 | 1/2020 | |
| WO | WO-2020097046 | A1 * | 5/2020 | ........... C03B 11/122 |

OTHER PUBLICATIONS

CN108264218A Machine Translation—Clarivate Analytics—Performed Mar. 23, 2023. (Year: 2023).*

International Search Report and Written Opinion of the International Searching Authority; PCT/US2020/061913; mailed on Mar. 12, 2021, 11 pages; European Patent Office.

"Bubsey, R.T et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (Oct. 1992)".

"Reddy, K.P.R. et al., "Fracture Toughness Measurement of Glass and Ceramic Materials Using Chevron-Notched Specimens," J. Am. Ceram. Soc., 71 [6], C-310-C-313 (1988)".

Fu et al., "Strong, tough glass-ceramics for emerging markets," Int J Appl Glas Sci, 2016, vol. 7, pp. 486-491.

Raj et al., "Solution-precipitation creep in glass ceramics," Acta Metalluirgica, 1981, vol. 29, pp. 159-166.

ASTM International, Standard Test Method for Determination of the Proportion of Phases in Portland Cement and Portland-Cement Clinker Using X-Ray Powder Diffraction Analysis—Designation: C1365-18, Published Apr. 2018.

Taiwanese Patent Application No. 109141284, Office Action dated Aug. 1, 2024, 3 pages (English Translation only), Taiwanese Patent Office.

Korean Patent Application No. 10-2022-7020969 , Office Action dated Dec. 6, 2024, 8 pages (English Translation only), Korean Patent Office.

* cited by examiner

3D GLASS-CERAMIC ARTICLES AND METHODS FOR MAKING THE SAME

This application claims the benefit of priority under 35 U.S.C. § 119 of U.S. Provisional Application Ser. No. 62/940,523 filed on Nov. 26, 2019 the content of which is relied upon and incorporated herein by reference in its entirety.

FIELD

The disclosure relates to glass-ceramic articles with increased resistance to fracture, and more particularly to three-dimensional (3D) glass-ceramic articles and ceramming schedules for making the same.

BACKGROUND

Glass-ceramic articles can be used as cover substrates and housings for mobile electronic devices. In some instances, glass-ceramic articles can have better mechanical properties than glass, such as resistance to crack penetration and drop performance.

Glass-ceramics including lithium disilicate/petalite have been developed for cover glass applications. Consumer electronic customers have shown interest in using 3D covers for portable electronic devices, such as smart phones, tablets, and laptops. A desirable cover glass may have a combination of a 2D surface, for interaction with a display, and a 3D surface, for wrapping around the edge of the display. Traditional computer numerical control (CNC) machining from a thick bulk article into a thin 3D shape is time consuming and energy intensive.

SUMMARY

Embodiments of the present disclosure provide methods of forming a glass-ceramic article into a 3D shape. By controlling the crystallinity of the glass-ceramics and the viscosity, 3D-shaped glass-ceramic articles with precise dimensions can be formed with desired surface quality while minimizing distortion. Furthermore, the 3D glass-ceramic articles formed from methods described herein may not require molds.

In a first aspect, a method of forming a glass-ceramic article is provided. The method may include pre-nucleating a precursor glass composition at a first nucleation temperature and maintaining the first nucleation temperature for a pre-nucleating time period to produce a pre-nucleated crystallizable glass composition, wherein the pre-nucleated crystallizable glass composition comprises 5 wt % to 20 wt % crystalline phase ASTM C1365-18; forming the pre-nucleated crystallizable glass composition into a pre-nucleated crystallizable glass composition with an initial 3D shape; nucleating the pre-nucleated crystallizable glass composition with the initial 3D shape for a nucleating time period to a second nucleation temperature to produce a nucleated crystallizable glass composition; and ceramming the nucleated crystallizable glass composition at a crystallization temperature and maintaining the crystallization temperature for a crystallization time period to produce the glass-ceramic article. The glass-ceramic article may have a dimensional control of a final 3D shape within 0.1 mm of an original design specification of the final 3D shape.

A second aspect may include the first aspect, wherein pre-nucleating the precursor glass composition comprises heating the precursor glass composition to the first nucleation temperature and maintaining the first nucleation temperature for the pre-nucleating time period.

A third aspect may include any of the preceding aspects, where the nucleated crystallizable glass composition comprises greater than 20 wt % crystalline phase.

A fourth aspect may include any of the preceding aspects, where the pre-nucleated crystallizable glass composition has a viscosity from $10^8$ poise to $10^{9.9}$ poise at the first nucleation temperature for the pre-nucleating time period.

A fifth aspect may include any of the preceding aspects, where the nucleated crystallizable glass composition has a viscosity greater than $10^{10}$ poise at the second nucleation temperature.

A sixth aspect may include any of the preceding aspects, where forming the pre-nucleated crystallizable glass composition into pre-nucleated crystallizable glass composition with the initial 3D shape comprises one or more of a pressing process, a sagging process, a rolling process, or a molding process.

A seventh aspect may include any of the preceding aspects, where the first nucleation temperature is from 500° C. to 650° C.

An eighth aspect may include any of the preceding aspects, where the second nucleation temperature is from 500° C. to 750° C.

A ninth aspect may include any of the preceding aspects, where forming the pre-nucleated crystallizable glass composition into the pre-nucleated crystallizable glass composition with the initial 3D shape occurs while heating the article to the second nucleation temperature, where the second nucleating temperature is higher than the first nucleating temperature.

A tenth aspect may include any of the preceding aspects, where forming the pre-nucleated crystallizable glass composition into the pre-nucleated crystallizable glass composition with the initial 3D shape occurs before nucleating the pre-nucleated crystallizable glass composition with the initial 3D shape.

In an eleventh aspect, a method of forming a glass-ceramic article is provided. The method may include forming a 3D formable pre-nucleated crystallizable glass sheet into a pre-nucleated crystallizable glass sheet with an initial 3D shape, wherein the pre-nucleated crystallizable glass sheet comprises 5 wt % to 20 wt % crystalline phase when measured according to ASTM C1365-18; nucleating the pre-nucleated crystallizable glass sheet with the initial 3D shape at a nucleation temperature for a nucleating time period to produce a nucleated crystallizable glass composition; crystallization the nucleated crystallizable glass composition to a crystallization temperature and maintaining the ceramming temperature for a crystallization time period to produce the glass-ceramic article, wherein the glass-ceramic article has a dimensional control of a final 3D shape is within 0.1 mm of an original design specification of the final 3D shape.

A twelfth aspect may include the eleventh aspect, where the 3D formable pre-nucleated crystallizable glass sheet has a viscosity from $10^{7.6}$ poise to $10^{9.9}$ poise during the forming into the initial 3D shape.

A thirteenth aspect may include the eleventh through twelfth aspects, where forming the pre-nucleated crystallizable glass sheet with the initial 3D shape comprises one or more of a pressing process, a sagging process, a rolling process, or a molding process.

A fourteenth aspect may include the eleventh through thirteenth aspects, where the second nucleation temperature is from 500° C. to 750° C.

A fifteenth aspect may include the eleventh through fourteenth aspects, where the nucleating time period is from 1 minute to 6 hours.

A sixteenth aspect may include the eleventh through fifteenth aspects, where the crystallization temperature is from 650° C. to 900° C.

A seventeenth aspect may include the eleventh through sixteenth aspects, where forming the 3D formable pre-nucleated sheet into the pre-nucleated crystallizable glass sheet with the initial 3D shape occurs simultaneously with nucleating the pre-nucleated crystallizable glass sheet with the initial 3D shape by heating the initial 3D shape to the nucleation temperature.

An eighteenth aspect may include the eleventh through seventeenth aspects, where forming the 3D formable pre-nucleated sheet into the pre-nucleated crystallizable glass sheet with the initial 3D shape occurs before nucleating the pre-nucleated crystallizable glass sheet with the initial 3D shape.

In a nineteenth aspect, a 3D formable pre-nucleated sheet is provided. The 3D formable pre-nucleated sheet may include a pre-nucleated crystallizable glass composition comprising 5 wt % to 20 wt % crystalline phase measured according to ASTM C1365-18.

A twentieth aspect may include the nineteenth aspect, where the 3D formable pre-nucleated sheet has a thickness of from 0.2 mm to 4.0 mm.

A twenty-first aspect may include any of the nineteenth through twentieth aspects, where the 3D formable pre-nucleated sheet has a uniform thickness.

A twenty-second aspect may include any of the nineteenth through twenty-first aspects, where the 3D formable pre-nucleated sheet has a non-uniform thickness.

A twenty-third aspect may include any of the nineteenth through twenty-second aspects, where the pre-nucleated crystallizable glass composition comprises from 55 mol % to 75 mol % $SiO_2$; from 0.2 mol % to 10 mol % $Al_2O_3$; from 15 mol % to 30 mol % $Li_2O$; from 0.2 mol % to 3.0 mol % $P_2O_5$; from 0.1 mol % to 10 mol % $ZrO_2$; and from 0.05 mol % to 1.0 mol % $SnO_2$.

A twenty-fourth aspect may include any of the nineteenth through twenty-third aspects, where the pre-nucleated crystallizable glass composition comprises one or more of less than 5 mol % $B_2O_3$; less than 2 mol % $Na_2O$; less than 2 mol % $K_2O$; less than 2 mol % MgO; and less than 2 mol % ZnO.

Additional features and advantages will be set forth in the detailed description that follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary and are intended to provide an overview or framework to understanding the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Definitions and Measurement Techniques

Figure 1:
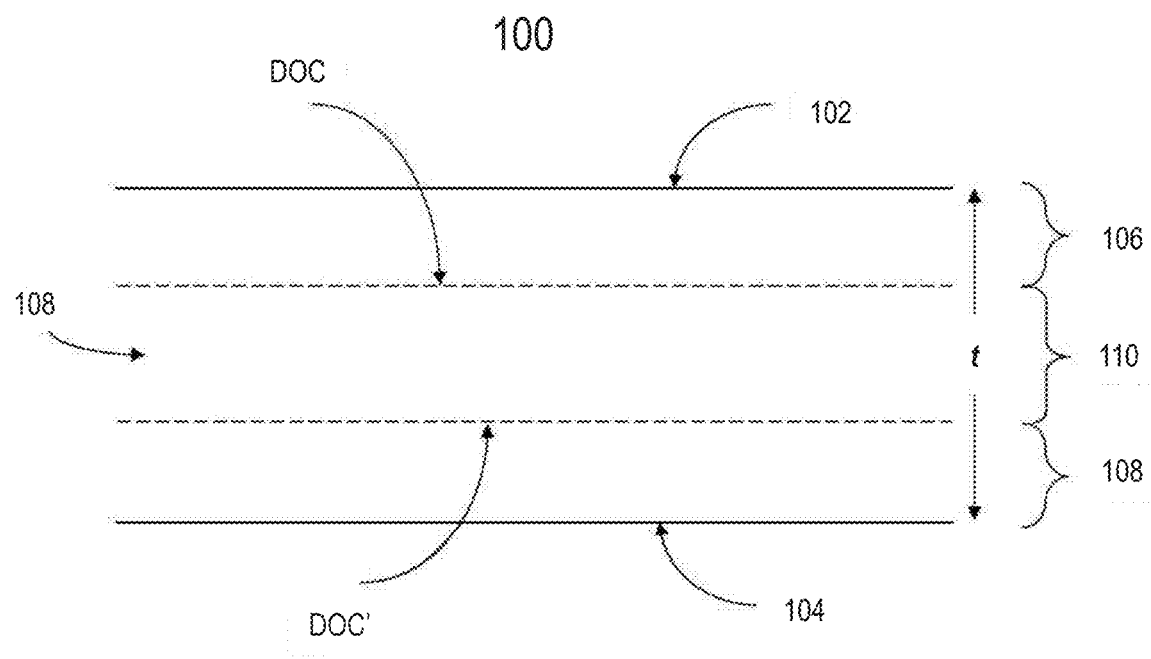
FIG. 1 is an exemplary cross-sectional view of a glass-ceramic article.

As used herein, the term "glass-ceramic" are solids prepared by controlled crystallization of a precursor glass and have one or more crystalline phases and a residual glass phase.

As used herein, "depth of compression" or "DOC" refers to the depth of a compressive stress (CS) layer and is the depth at which the stress within a glass-ceramic article changes from compressive stress to tensile stress and has a stress value of zero. According to the convention normally used in the art, compressive stress is expressed as a negative (<0) stress and tensile stress is expressed as a positive (>0) stress. Throughout this description, however, and unless otherwise noted, CS is expressed as a positive or absolute value that is, as recited herein, CS=|CS|.

The DOC and maximum central tension (CT) values are measured using a scattered light polariscope (SCALP) model number SCALP-04 available from GlasStress Ltd., located in Tallinn, Estonia.

The surface CS measurement method depends on whether or not a vitreous region or layer is formed at the surface of the glass-ceramic article during ion exchange. If there is no vitreous layer or region, then the surface CS is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. If a vitreous region or layer is formed, then the surface CS (and the CS of the vitreous layer or region) is measured by the birefringence of the first transmission (coupling) resonance of the vitreous region in a prism coupling measurement and measures the depth of layer of the vitreous region by the spacing between the first and second transmission resonances or the breadth of the first transmission resonance.

The CS in the remainder of the CS region is measured by the refracted near-field (RNF) method described in U.S. Pat.

No. 8,854,623, entitled "Systems and methods for measuring a profile characteristic of a glass sample", which is hereby incorporated by reference in its entirety. The RNF measurement is force balanced and calibrated to the maximum CT value provided by a SCALP measurement. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system with the signal photodetector generating a polarization-switched detector signal. The method also includes dividing the detector signal by the reference signal to form a normalized detector signal and determining the profile characteristic of the glass sample from the normalized detector signal.

The stress profile may be measured with a combination of RNF for the inner CS, SCALP for the CT region, and the method used for measuring the surface CS.

Stored tensile energy in (J/m$^2$) is calculated using the following Equation (1):

$$\text{stored tensile energy } (J/m^2) = [(1-v)/E] \int (\sigma^2)(dt) \quad (1)$$

where v is Poisson's ratio, E is the Young's modulus, σ is the stress, t is the thickness, and the integration is calculated across the thickness of the tensile region only.

The crystalline phase assemblage (before ion exchange) and weight percentage of the crystalline phases and residual glass phase is determined based on x-ray diffraction (XRD) using a Rietveld analysis. The weight percentage of the crystalline phase and residual glass phase may be determined according to ASTM C1365-18.

The following procedure, referred to herein as "the Fragment Test", is used for determining the number of fragments the glass-ceramic article breaks into upon fracture. An ion-exchanged glass-ceramic article have dimensions of 50 mm by 50 mm by 0.8 mm is placed on a steel surface. A stylus with a tungsten carbide tip (available from Fisher Scientific Industries, under the trademark TOSCO® and manufacturer identifying number #13-378, with a 60-degree coni-spherical tip) having a weight of 40 g is connected to a clamp on a gear driven mechanism that moves the stylus up and down. The tip of the stylus is placed in contact with the glass-ceramic article and then the gear mechanism is incrementally turned until the glass-ceramic article breaks. Then the number of fragments is counted.

The fracture toughness value ($K_{1C}$) was measured by chevron notched short bar (CNSB) method disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that $Y^*_m$ is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992).

The Young's modulus values recited in this disclosure refer to a value as measured by a resonant ultrasonic spectroscopy technique of the general type set forth in ASTM E2001-13.

Haze of a glass-ceramic article is measured using a haze meter, such as the BYK Gardner Haze-Gard i.

The transmittance, as utilized herein refers to total transmittance, and is measured with a Perkin Elmer Lambda 950 UV/VIS/NIR spectrophotometer with a 150 mm integrating sphere. The samples were mounted at the sphere's entrance port, allowing for collection of wide angle scattered light. The total transmittance data was collected with the reference Spectralon reflectance disc over the sphere's exit port. The percent of total transmittance (% T) was calculated relative to an open beam baseline measurement.

General Overview of Properties of Glass-Ceramic Articles

Reference will now be made in detail to embodiments, examples of which is/are illustrated in the accompanying drawings. Whenever possible, the same reference numerals will be used throughout the drawings to refer to the same or like parts.

Glass-ceramic articles have attributes that can be tailored for use as cover substrates and/or housings for mobile electronic devices. For example, without being bound by theory, glass-ceramic articles with high fracture toughness and/or high Young's modulus can provide resistance to crack penetration and drop performance. When such glass-ceramic articles are chemically strengthened, for example through ion exchange, the resistance to crack penetration and drop performance can be further enhanced. And, the high fracture toughness and/or Young's modulus can also increase the amount of stored tensile energy and maximum central tension that can be imparted to the glass-ceramic article through chemical tempering while maintaining desirable fragmentation of the glass-ceramic article upon fracture. As another example, the optical characteristics of the glass-ceramic articles, such as transparency and haze, can be tailored by adjusting the heating/ceramming schedule used to turn a glass article into a glass-ceramic article as well as through chemical strengthening, such as ion exchange.

FIG. 1 depicts an exemplary cross-sectional side view of a glass-ceramic article 100 having a first surface 102 and an opposing second surface 104 separated by a thickness (t). In embodiments, glass-ceramic article 100 has been ion exchanged and has a compressive stress (CS) layer 106 (or first region) extending from first surface 102 to a depth of compression (DOC). In embodiments, as shown in FIG. 1, the glass-ceramic article 100 also has a compressive stress (CS) layer 108 extending from second surface 104 to a depth of compression DOC'. There is also a central tension region 110 under tensile stress in between DOC and DOC'.

In embodiments, DOC and DOC' may be in a range from greater than 0*t to 0.30*t, such as, greater than 0*t to 0.25*t, greater than 0*t to 0.20*t, greater than 0*t to 0.15*t, greater than 0*t to 0.10*t, greater than 0*t to 0.05*t, greater than 0.05*t to 0.30*t, greater than 0.05*t to 0.25*t, greater than 0.05*t to 0.20*t, greater than 0.05*t to 0.15*t, greater than 0.05*t to 0.10*t, greater than 0.10*t to 0.30*t, greater than 0.10*t to 0.25*t greater than 0.10*t to 0.20*t, greater than 0.10*t to 0.15*t, and all ranges and subranges therebetween, wherein t is the thickness of the glass ceramic article 100. For example, the depth of a compressive stress (DOC, DOC') can be greater than 0.05*t, 0.06*t, 0.07*t, 0.08*t, 0.09*t, 0.10*t, 0.11*t, 0.12*t, 0.13*t, 0.14*t, 0.15*t, 0.16*t, 0.17*t, 0.18*t, 0.19*t, 0.20*t, 0.21*t, 0.22*t, 0.23*t, 0.24*t, 0.25*t, 0.26*t, 0.27*t, 0.28*t, 0.29*t, or 0.30*t. In other embodiments, the depth of a compressive stress layer (DOC, DOC') is in a range from 0.05 mm to 0.60 mm, 0.05 mm to 0.50 mm, 0.05 mm to 0.40 mm, 0.05 mm to 0.30 mm, 0.05 mm to 0.20 mm, 0.05 mm to 0.10 mm, 0.10 mm to 0.60 mm, 0.10 mm to 0.50 mm, 0.10 mm to 0.40 mm, 0.10 mm to 0.30 mm, 0.20 mm to 0.60 mm, 0.20 mm to 0.50 mm, 0.20 mm to 0.40 mm, and all ranges and subranges therebetween. In embodiments the depth of the compressive stress layer is greater than or equal to 0.05 mm, 0.06 mm, 0.07 mm, 0.08 mm. 0.09 mm, 0.10 mm. 0.15 mm, 0.20 mm, 0.25 mm, 0.30 mm, 0.35 mm, 0.40 mm. 0.45 mm, 0.50 mm, 0.55 mm or 0.60 mm. In embodiments DOC may be the same as DOC'. In other embodiments, DOC may be different than DOC'.

In embodiments, the maximum central tension (CT) is in a range from greater than 90 MPa to 180 MPa. In embodiments, the maximum CT is greater than or equal to 90 MPa, 100 MPa, 110 MPa, 120 MPa, 130 MPa, 140 MPa, 150 MPa, 160 MPa, or 170 MPa. In embodiments, the maximum CT can be in a range from greater than 90 MPa to 180 MPa, greater than 90 MPa to 170 MPa, greater than 90 MPa to 160 MPa, greater than 90 MPa to 150 MPa, greater than 90 MPa to 140 MPa, 100 MPa to 180 MPa, 100 MPa to 170 MPa, 100 MPa to 160 MPa, 100 MPa to 150 MPa, 100 MPa to 140 MPa, 110 MPa to 180 MPa, 110 MPa to 170 MPa, 110 MPa to 160 MPa, 110 MPa to 150 MPa, 110 MPa to 140 MPa, 120 MPa to 180 MPa, 120 MPa to 170 MPa, 120 MPa to 160 MPa, 120 MPa to 150 MPa, 120 MPa to 140 MPa, 130 MPa to 180 MPa, 130 MPa to 170 MPa, 130 MPa to 1500 MPa or any range and subrange therebetween.

In embodiments, the stored tensile energy of the glass-ceramic article is in a range from greater than 22 $J/m^2$ to 60 $J/m^2$, greater than 22 $J/m^2$ to 55 $J/m^2$, greater than 22 $J/m^2$ to 50 $J/m^2$, greater than 22 $J/m^2$ to 45 $J/m^2$, greater than 22 $J/m^2$ to 40 $J/m^2$, greater than 22 $J/m^2$ to 35 $J/m^2$, greater than 22 $J/m^2$ to 30 $J/m^2$, 25 $J/m^2$ to 60 $J/m^2$, 25 $J/m^2$ to 55 $J/m^2$, 25 $J/m^2$ to 50 $J/m^2$, 25 $J/m^2$ to 45 $J/m^2$, 25 $J/m^2$ to 40 $J/m^2$, 25 $J/m^2$ to 35 $J/m^2$, 25 $J/m^2$ to 30 $J/m^2$, 30 $J/m^2$ to 60 $J/m^2$, 30 $J/m^2$ to 55 $J/m^2$, 30 $J/m^2$ to 50 $J/m^2$, 30 $J/m^2$ to 45 $J/m^2$, 30 $J/m^2$ to 40 $J/m^2$, 30 $J/m^2$ to 35 $J/m^2$, 35 $J/m^2$ to 60 $J/m^2$, 35 $J/m^2$ to 55 $J/m^2$, 35 $J/m^2$ to 50 $J/m^2$, 35 $J/m^2$ to 45 $J/m^2$, 35 $J/m^2$ to 40 $J/m^2$, 40 $J/m^2$ to 60 $J/m^2$, 40 $J/m^2$ to 55 $J/m^2$, 40 $J/m^2$ to 50 $J/m^2$, 40 $J/m^2$ to 45 $J/m^2$, 45 $J/m^2$ to 60 $J/m^2$, 45 $J/m^2$ to 55 $J/m^2$, 45 $J/m^2$ to 50 $J/m^2$, and all ranges and subranges therebetween. In embodiments, the stored tensile energy can be greater than or equal to 22 $J/m^2$, 23 $J/m^2$, 24 $J/m^2$, 25 $J/m^2$, 30 $J/m^2$, 35 $J/m^2$, 40 $J/m^2$, 45 $J/m^2$, 50 $J/m^2$, or 55 $J/m^2$.

In embodiments, the glass-ceramic article has a thickness t in a range from 0.2 mm to 4.0 mm, 0.2 mm to 3.0 mm, 0.2 mm to 2.0 mm, 0.2 mm to 1.5 mm, 0.2 mm to 1.0 mm, 0.2 mm to 0.9 mm, 0.2 mm to 0.8 mm, 0.2 mm to 0.7 mm, 0.2 mm to 0.6 mm, 0.2 mm to 0.5 mm, 0.3 mm to 4.0 mm, 0.3 mm to 3.0 mm, 0.3 mm to 2.0 mm, 0.3 mm to 1.5 mm, 0.3 mm to 1.0 mm, 0.3 mm to 0.9 mm, 0.3 mm to 0.8 mm, 0.3 mm to 0.7 mm, 0.3 mm to 0.6 mm, 0.3 mm to 0.5 mm, 0.4 mm to 4.0 mm, 0.4 mm to 3 mm, 0.4 mm to 2.0 mm, 0.4 mm to 1.5 mm, 0.4 mm to 1.0 mm, 0.4 mm to 0.9 mm, 0.4 mm to 0.8 mm, 0.4 mm to 0.7 mm, 0.4 mm to 0.6 mm, 0.5 mm to 4.0 mm, 0.5 mm to 3.0 mm, 0.5 mm to 2.0 mm, 0.5 mm to 1.5 mm, 0.5 mm to 1.0 mm, 0.5 mm to 0.9 mm, 0.5 mm to 0.8 mm, 0.5 mm to 0.7 mm, 0.8 mm to 4 mm, 0.8 mm to 3.0 mm, 0.8 mm to 2.0 mm, 0.8 mm to 1.5 mm, 0.8 mm to 1.0 mm, 1.0 mm to 2.0 mm, 1.0 mm to 1.5 mm, and all ranges and subranges therebetween. In embodiments, the glass-ceramic article may be shaped, for example it may have a 2.5D or 3D shape. In embodiments, the glass-ceramic article may have a uniform thickness, or the glass-ceramic article may not have a uniform thickness.

In embodiments, the fracture toughness of the glass-ceramic article is in a range from 1.0 MPa$\sqrt{m}$ to 2.0 MPa$\sqrt{m}$, 1.1 MPa$\sqrt{m}$ to 2.0 MPa$\sqrt{m}$, 1.2 MPa$\sqrt{m}$ to 2.0 MPa$\sqrt{m}$, 1.3 MPa$\sqrt{m}$ to 2.0 MPa$\sqrt{m}$, 1.4 MPa$\sqrt{m}$ to 2.0 MPa$\sqrt{m}$, 1.5 MPa$\sqrt{m}$ to 2.0 MPa$\sqrt{m}$, 1.0 MPa$\sqrt{m}$ to 1.9 MPa$\sqrt{m}$, 1.1 MPa$\sqrt{m}$ to 1.9 MPa$\sqrt{m}$, 1.2 MPa$\sqrt{m}$ to 1.9 MPa$\sqrt{m}$, 1.3 MPa$\sqrt{m}$ to 1.9 MPa$\sqrt{m}$, 1.4 MPa$\sqrt{m}$ to 1.9 MPa$\sqrt{m}$, 1.5 MPa$\sqrt{m}$ to 1.9 MPa$\sqrt{m}$, 1.0 MPa$\sqrt{m}$ to 1.8 MPa$\sqrt{m}$, 1.1 MPa$\sqrt{m}$ to 1.8 MPa$\sqrt{m}$, 1.2 MPa$\sqrt{m}$ to 1.8 MPa$\sqrt{m}$, 1.3 MPa$\sqrt{m}$ to 1.8 MPa$\sqrt{m}$, 1.4 MPa$\sqrt{m}$ to 1.8 MPa$\sqrt{m}$, 1.5 MPa$\sqrt{m}$ to 1.8 MPa$\sqrt{m}$, and all ranges and subranges therebetween. In embodiments, the fracture toughness of the glass-ceramic article is greater than or equal to 1.0 MPa$\sqrt{m}$, 1.1 MPa$\sqrt{m}$, 1.2 MPa$\sqrt{m}$, 1.3 MPa$\sqrt{m}$, 1.4 MPa$\sqrt{m}$, 1.5 MPa$\sqrt{m}$, 1.6 MPa$\sqrt{m}$, 1.7 MPa$\sqrt{m}$, 1.8 MPa$\sqrt{m}$, or 1.9 MPa$\sqrt{m}$.

In embodiments, the Young's modulus of the glass-ceramic article is in a range from 95 GPa to 110 GPa, 95 GPa to 105 GPa, 95 GPa to 100 GPa, 100 GPa to 110 GPa, 100 GPa to 105 GPa, 105 GPa to 110 GPa and all ranges and subranges therebetween. In embodiments, the Young's modulus of the glass-ceramic article is greater than or equal to 95 GPa, 96 GPa, 97 GPa, 98 GPa, 99 GPa, 100 GPa, 101 GPa, 102 GPa, 103 GPa, 104 GPa, 105 GPa, 106 GPa, 107 GPa, 108 GPa, or 109 GPa.

In embodiments, upon application of the Fragment Test (based on a 50 mm by 50 mm by 0.8 mm sample) described above, the glass-ceramic article breaks into less than 5 fragments, less than 4 fragments, or less than 3 fragments.

Compositions

The precursor glasses and glass-ceramics described herein may be generically described as lithium-containing aluminosilicate glasses or glass-ceramics and comprise $SiO_2$, $Al_2O_3$, and $Li_2O$. In addition to $SiO_2$, $Al_2O_3$, and $Li_2O$, the glasses and glass-ceramics disclosed herein may further contain alkali salts, such as $Na_2O$, $K_2O$, $Rb_2O$, or $Cs_2O$, as well as $P_2O_5$, and $ZrO_2$ and a number of other components as described below. In embodiments, the precursor glass (before ceramming) and/or the glass-ceramic (after ceramming) may have the following composition in mole percentage on an oxide basis:

$SiO_2$: 55-75%;
$Al_2O_3$: 0.2-10%;
$Li_2O$: 15-30%;
$P_2O_5$: 0.2-3.0%;
$ZrO_2$: 0.1-10%; and
$SnO_2$: 0.05-1.0%.

In embodiments, precursor glass and/or the glass-ceramic may have the following optional additional components in mole percentage on an oxide basis:

$B_2O_3$: 0-5%;
$Na_2O$: 0-2%;
$K_2O$: 0-2%;
MgO: 0-2%; and
ZnO: 0-2.

$SiO_2$, an oxide involved in the formation of glass, can function to stabilize the networking structure of glasses and glass-ceramics. In embodiments, the glass or glass-ceramic composition comprises from 55 to 75 mol % $SiO_2$. In embodiments, the glass or glass-ceramic composition can comprise $SiO_2$ in amounts from 55 to 70 mol %, 55 to 65 mol %, 55 to 60 mol %, 60 to 75 mol %, 60 to 70 mol %, 60 to 65 mol %, 65 to 75 mol %, 65 to 70 mol %, 70 to 75 mol %, and all ranges and subranges therebetween. In embodiments, the glass or glass-ceramic composition comprises 55, 56, 57, 58, 59, 60, 61, 62, 63, 64, 65, 66, 67, 68, 69, 70, 71, 72, 73, 74, or 75 mol % $SiO_2$.

With respect to viscosity and mechanical performance, the viscosity and mechanical performance are influenced by glass compositions. In the glasses and glass-ceramics, $SiO_2$ serves as the primary glass-forming oxide for the precursor glass and can function to stabilize the networking structure of glass and glass-ceramic. The amount of $SiO_2$ may be limited to control melting temperature (200 poise temperature), as the melting temperature of pure $SiO_2$ or high-$SiO_2$ glasses is undesirably high.

$Al_2O_3$ may also provide stabilization to the network and provides improved mechanical properties and chemical durability. If the amount of $Al_2O_3$ is too high, however, the fraction of lithium silicate crystals may be decreased, possibly to the extent that an interlocking structure cannot be formed. The amount of $Al_2O_3$ can be tailored to control viscosity. Further, if the amount of $Al_2O_3$ is too high, the viscosity of the melt is also generally increased. In embodiments, the glass or glass-ceramic composition can comprise $Al_2O_3$ in amounts from 0.2 to 10.0 mol %, 0.2 to 8.0 mol %, 0.2 to 6.0 mol %, 0.2 to 4.0 mol %, 0.2 to 2.0 mol %, 0.2 to 1.0 mol %, 1.0 to 10 mol %, 1.0 to 8.0 mol %, 1.0 to 6.0 mol %, 1.0 to 4.0 mol %, 1.0 to 2.0 mol %, 2.0 to 10.0 mol %, 2.0 to 8.0 mol %, 2.0 to 6.0 mol %, 2.0 to 4.0 mol %, 4.0 to 10.0 mol %, 4.0 to 8.0 mol %, 4.0 to 6.0 mol %, 6.0 to 10.0 mol %, 6.0 to 8.0 mol %, 8.0 to 10.0 mol %, and all ranges and subranges therebetween. In embodiments, the glass or glass-ceramic composition can comprise 0.2, 0.3, 0.4, 0.5, 0.6, 0.7, 0.8, 0.9, 1.0, 2.0, 3.0, 4.0, 5.0, 6.0, 7.0, 8.0, 9.0, or 10.0 mol % $Al_2O_3$.

In the glass and glass-ceramics herein, $Li_2O$ aids in forming crystal phases. In embodiments compositions, the glass or glass-ceramic can comprise from 15 mol % to 30 mol % $Li_2O$. In embodiments, the glass or glass-ceramic composition can comprise $Li_2O$ in amounts from 15 to 25 mol %, 15 to 20 mol %, 20 to 30 mol %, 20 to 25 mol %, 25 to 30 mol %, and all ranges and subranges therebetween. In embodiments, the glass or glass-ceramic composition can comprise 15, 16, 17, 18, 19, 20, 21, 22, 23, 24, 25, 26, 27, 28, 29, or 30 mol % $Li_2O$.

As noted above, $Li_2O$ is generally useful for forming the glass-ceramics of embodiments, but other alkali oxides tend to decrease glass-ceramic formation and form an aluminosilicate residual glass in the glass-ceramic. It has been found that if the amount of other alkali metal oxides, such as $Na_2O$, $K_2O$, $Rb_2O$, $Cs_2O$, is too high there can be an undesirable amount of residual glass, which can lead to deformation during crystallization and undesirable microstructures from a mechanical property perspective. The composition of the residual glass may be tailored to control viscosity during crystallization, minimizing deformation or undesirable thermal expansion, or control microstructure properties. Therefore, in general, the compositions described herein have low amounts of non-lithium alkali oxides. In embodiments, the glass or glass-ceramic composition can comprise a ratio of $Li_2O$ (mol %)/$R_2O$ (mol %) greater than 0.85 to 1.00, from greater than 0.85 to 0.97, from greater than 0.85 to 0.95, from 0.86 to 1.00, from 0.86 to 0.97, from 0.86 to 0.95, from 0.87 to 1.00, from 0.87 to 0.97, from 0.87 to 0.95, from 0.88 to 1.00, from 0.88 to 0.97, from 0.88 to 0.95, from 0.89 to 1.00, from 0.89 to 0.97, from 0.89 to 0.95, from 0.90 to 1.00, from 0.90 to 0.97, from 0.90 to 0.95, from 0.91 to 1.00, from 0.91 to 0.97, from 0.91 to 0.95, from 0.92 to 1.00, from 0.92 to 0.97, from 0.93 to 1.00, from 0.93 to 0.97, from 0.94 to 1.00, from 0.95 to 1.00, from 0.96 to 1.00, from 0.97 to 1.00 and all ranges and subranges therebetween. $R_2O$ is the sum of all alkali metal oxides including $Li_2O$, $Na_2O$, $K_2O$, $Rb_2O$, and $Cs_2O$. In embodiments the glass or glass-ceramic composition can comprise a ratio of $Li_2O$ (mol %)/$R_2O$ (mol %) greater than or equal to 0.85, 0.86, 0.87, 0.88, 0.89, 0.9, 0.91, 0.92, 0.93, 0.94, 0.95, 0.96, 0.97, 0.98, or 0.99.

The glass and glass-ceramic compositions can include $P_2O_5$. $P_2O_5$ can function as a nucleating agent to produce bulk nucleation. If the concentration of $P_2O_5$ is too low, the precursor glass may only crystallize at higher temperatures (due to a lower viscosity) and from the surface inward. This yields a weak and often deformed body. However, if the concentration of $P_2O_5$ is too high, the devitrification upon cooling during precursor glass forming can be difficult to control. Embodiments can comprise $P_2O_5$ in amounts from 0.2 to 3 mol %, 0.2 to 2 mol %, 0.2 to 1 mol %, 1 to 3 mol %, 1 to 2 mol %, 2 to 3 mol %, and all ranges and subranges therebetween. In embodiments, the glass or glass-ceramic composition can comprise 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0 mol % $P_2O_5$.

In the glass and glass-ceramics disclosed herein, it is generally found that $ZrO_2$ can improve the stability of $Li_2O$—$Al_2O_3$—$SiO_2$—$P_2O_5$ glass by significantly reducing glass devitrification during forming and lowering the liquidus temperature. The addition of $ZrO_2$ can also help decrease the grain size of the crystals, which aids in the formation of a transparent glass-ceramic. In embodiments, the glass or glass-ceramic composition can comprise $ZrO_2$ in amounts from 0.1 mol % to 10.0 mol %, 0.1 mol % to 8.0 mol %, 0.1 to 6.0 mol %, 0.1 mol % to 4.0 mol %, 0.1 mol % to 2.0 mol %, 0.1 mol % to 1.0 mol %, 1.0 mol % to 10 mol %, 1.0 mol % to 8.0 mol %, 1.0 mol % to 6.0 mol %, 1.0 mol % to 4.0 mol %, 1.0 mol % to 2.0 mol %, 2.0 mol % to 10 mol %, 2.0 mol % to 8.0 mol %, 2.0 mol % to 6.0 mol %, 2.0 mol % to 4.0 mol %, 4.0 mol % to 10.0 mol %, 4.0 mol % to 8.0 mol %, 4.0 mol % to 6.0 mol %, 6.0 mol % to 10.0 mol %, 6.0 mol % to 8.0 mol %, 8.0 to 10.0 mol %, and all ranges and subranges therebetween. In embodiments, the glass or glass-ceramic composition can comprise 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, or 10.0 mol % $ZrO_2$.

In one or more embodiments, the glasses and glass-ceramics herein can comprise from 0.05 mol % to 1.0 mol % $SnO_2$ as a filling agent. In embodiments, the glass or glass-ceramic composition can comprise $SnO_2$ in amounts from 0.05 mol % to 1.00 mol %, 0.05 mol % to 0.80 mol %, 0.05 mol % to 0.60 mol %, 0.05 mol % to 0.40 mol %, 0.05 mol % to 0.20 mol %, 0.05 mol % to 0.10 mol %, 0.10 mol % to 1.00 mol %, 0.10 mol % to 0.80 mol %, 0.10 mol % to 0.60 mol %, 0.10 mol % to 0.40 mol %, 0.10 mol % to 0.20 mol %, 0.20 mol % to 1.00 mol %, 0.20 mol % to 0.80 mol %, 0.20 mol % to 0.60 mol %, 0.20 mol % to 0.40 mol %, 0.40 mol % to 1.00 mol %, 0.40 mol % to 0.80 mol %, 0.40 mol % to 0.60 mol %, 0.60 mol % to 1.00 mol %, 0.60 mol % to 0.80 mol %, or 0.80 mol % to 1.00 mol %, and all ranges and subranges therebetween. In embodiments, the glass or glass-ceramic composition can comprise 0.05, 0.10, 0.20, 0.30, 0.40, 0.50, 0.60, 0.70, 0.80, 0.90, or 1.00 mol % $SnO_2$.

$B_2O_3$ is conducive to providing a precursor glass with a low melting temperature. Furthermore, the addition of $B_2O_3$ in the precursor glass, and thus in the glass-ceramics, helps achieve an interlocking crystal microstructure and can improve the damage resistance of the dglass-ceramic. When boron in the residual glass is not charge balanced by alkali oxides or divalent cation oxides, it will be in trigonal-coordination state (or three-coordinated boron), which opens up the structure of the glass. The network around these three-coordinated boron is not as rigid as tetrahedrally coordinated (or four-coordinated) boron. Without being bound by theory, it is believed that precursor glasses and glass-ceramics that include three-coordinated boron can tolerate some degree of deformation before crack formation. By tolerating some deformation, the Vickers indentation crack initiation values are increased. Fracture toughness of the precursor glasses and glass-ceramics that include three-coordinated boron may also be increased. Without being bound by theory, it is believed that the presence of boron in the residual glass of the glass-ceramic (and precursor glass) lowers the viscosity of the residual glass (or precursor glass), which facilitates the growth of lithium silicate crystals, especially large crystals having a high aspect ratio. A greater amount of three-coordinated boron (in relation to four-coordinated boron) is believed to result in glass-ceramics that exhibit a greater Vickers indentation crack initiation load. In embodiments, the amount of three-coordinated boron (as a percent of total $B_2O_3$) may be 40% or greater, 50% or greater, 75% or greater, 85% or greater or even 95% or greater. The amount of boron in general should be controlled to maintain chemical durability and mechanical strength of the cerammed bulk glass-ceramic.

In one or more embodiments, the glasses and glass-ceramic herein can comprise $B_2O_3$ in amounts from 0 to 5 mol %, 1 to 4 mol %, or 2 to 3 mol % and all ranges and subranges therebetween. In embodiments, the glass or glass-ceramic composition can comprise 0, >0, 0.1, 0.2, 0.3, 0.4, 0.5, 0.6, 0.7, 0.8, 0.9, 1.0, 2.0, 3.0, 4.0, or 5.0 mol % $B_2O_3$.

When the amount of transition metal oxides, for example $Fe_2O_3$, are too high, they can affect the color of the glass-ceramic and thereby affect the transparency of the glass-ceramic. In embodiments, the glass and/or glass-ceramic composition can comprise $Fe_2O_3$ in amounts less than 0.5 mol %, 0.4 mol %, 0.3 mol %, 0.2 mol %, 0.1 mol %, or 0.05 mol %.

The glass compositions described herein may further comprise MgO. MgO lowers the viscosity of a glass, which enhances the formability, the strain point, and the Young's modulus, and may improve the ion exchangeability. However, when too much MgO is added to the glass composition, the density and the CTE of the glass composition may increase. In embodiments, the concentration of MgO in the glass composition may be in the range from 0 mol % to 2.0 mol %, from 0 mol % to 1.5 mol %, from 0 mol % to 1.0 mol %, from 0.5 mol % to 2.0 mol %, from 0.5 mol % to 1.5 mol %, from 0.5 mol % to 1.0 mol %, from 1.0 mol % to 2.0 mol %, from 1.0 mol % to 1.5 mol %, or from 1.5 mol % to 2.0 mol %, or any and all sub-ranges formed from any of these endpoints. In embodiments, the concentration of MgO is less than or equal to 2.0 mol %, 1.5 mol %, 1.0 mol %, or 0.5 mol %. In embodiments, the concentration of MgO in the glass composition may be in the range from 0 mol % to 2.0 mol %.

The glass compositions described herein may further comprise ZnO. When the amount of ZnO, is too high it can affect the viscosity of the glass-ceramic and thereby affect the formability of the glass-ceramic. In embodiments, the concentration of ZnO in the glass composition may be in the range from 0 mol % to 2.0 mol %, from 0 mol % to 1.5 mol %, from 0 mol % to 1.0 mol %, from 0.5 mol % to 2.0 mol %, from 0.5 mol % to 1.5 mol %, from 0.5 mol % to 1.0 mol %, from 1.0 mol % to 2.0 mol %, from 1.0 mol % to 1.5 mol %, or from 1.5 mol % to 2.0 mol % ZnO, or any and all sub-ranges formed from any of these endpoints. In embodiments, the concentration of ZnO is less than or equal to 2.0 mol %, 1.5 mol %, 1.0 mol %, or 0.5 mol %. In embodiments, the concentration of ZnO in the glass composition may be in the range from 0 mol % to 2.0 mol %.

Methods of Forming a 3D Glass-Ceramic Article

As stated previously, it may be desirable for consumer products to include a cover glass having a combination of a 2D surface and a 3D surface. However, traditional computer numerical control (CNC) machining methods of forming glass-ceramic article into 3D shapes can be time consuming and energy intensive. Thermal reforming methods are conventionally used to form 3D glass articles from 2D glass sheets. Such methods conventionally involve heating a 2D glass sheet to a desired forming temperature and then reforming the 2D glass sheet into a 3D shape. The reforming steps may be done by sagging methods, which use gravity or a vacuum to form the 3D shape, or by pressing methods, which press the 2D glass sheet against a mold to form the 3D shape. In both the sagging and pressing methods, it may be desirable to keep the temperature of the glass below its softening point to maintain desirable surface quality. Additionally, in pressing methods, it is desirable to keep the temperature of the glass below its softening point to avoid a reaction between the glass and the mold. Moreover, glass may have a high viscosity (i.e. greater than $10^{10}$ poise) below its strain point. The glass may therefore require relatively higher pressure to form complex shapes such as bends, corners, and curves. In traditional glass thermal reforming methods, a plunger, which contacts the glass and presses the glass against the mold, is used to apply the needed pressure.

Conventional thermal reforming methods may be challenging for glass-ceramics having a high crystallinity (i.e. greater than 20 wt % crystals) due to the relatively high viscosity (i.e. greater than $10^{10}$ poise) that results from the crystalline phases of the glass-ceramics. Additionally, the thermal reforming methods may be time consuming and requires temperatures close to 1000° C., which may negatively affect mold life. As such, there is a need to explore new ways to reform glass-ceramics.

Embodiments of the present disclosure meet those needs by providing methods of forming glass-ceramic articles. The disclosed methods may form 3D glass-ceramic articles that have a desired surface quality with minimal distortion of the initially-formed 3D shape. By controlling the crystallinity of the glass-ceramics and their viscosity, 3D-shaped glass-ceramic articles may be formed having precise dimensions, when compared to design specifications. Furthermore, the 3D glass-ceramic articles formed from methods described herein may not require molds. As such, the disclosed methods, which utilize glass-ceramics having a crystallinity less than 20 wt % crystals may have a viscosity (i.e. less than $10^{10}$ poise), may provide more-efficient methods of forming glass-ceramic articles for cover glass applications.

As used herein, "dimensional control" refers to the difference between the maximum variance and the lowest variance between the dimensions of the original design specifications of the 3D shape and the actual dimensions of the final 3D shape. In embodiments, the dimensional control of the final 3D shape is within 0.1 mm of the original design specifications of the 3D shape.

In one or more embodiments, the processes for forming may include heat treating a precursor glass at one or more preselected temperatures for one or more preselected times to induce glass homogenization and crystallization (i.e., nucleation and growth) of two or more crystalline phases (e.g., having one or more compositions, amounts, morphologies, sizes or size distributions, etc.). In embodiments, the processes may include forming the precursor glass into an initial 3D shape before heat treating. In embodiments, the processes may include forming an initial 3D shape after heat treating the precursor glass to produce a pre-nucleated crystallizable glass composition.

In embodiments, the method of forming a glass-ceramic article may include initially nucleating a precursor glass composition at a first nucleation temperature and maintaining the first nucleation temperature for a pre-nucleating time period to produce a pre-nucleated crystallizable glass composition; forming the pre-nucleated crystallizable glass composition into an initial 3D shape; further nucleating the initial 3D shape at a second nucleation temperature for a nucleating time period to produce a nucleated crystallizable glass composition; and ceramming the nucleated crystallizable glass composition to a crystallization temperature and maintaining the ceramming temperature for a crystallization time period to produce the glass-ceramic article.

As stated previously, in embodiments, the precursor glass composition may be formed into an initial 3D shape from a sheet comprising the precursor glass composition before nucleating the precursor glass composition. Nucleating the precursor glass composition may include heating the precursor glass composition at one or more preselected temperatures for one or more preselected times to induce glass homogenization and crystallization (i.e., nucleation and growth) of two or more crystalline phases (e.g., having one or more compositions, amounts, morphologies, sizes or size distributions, etc.). Forming the precursor glass into the initial 3D shape may include one or more of a pressing process, a sagging process, a rolling process, or a molding process. Sagging processes include using gravity or a vacuum to form the 3D shape. Pressing processes include pressing the 2D sheet against a mold to form the precursor glass into the 3D shape. In both the sagging and pressing methods, it is desirable to keep the temperature of the glass below its softening point to maintain desirable surface quality. Additionally, in pressing methods, it is desirable to keep the temperature of the glass below its softening point to avoid a reaction between the glass and the mold.

In embodiments, the precursor glass composition may be formed into the initial 3D shape simultaneously while nucleating the precursor glass at the first nucleation temperature as described subsequently herein. In embodiments, forming the precursor glass into the initial 3D shape may occur before heating the precursor glass to the second nucleation temperature. In embodiments, forming the precursor glass into the initial 3D shape may occur while heating the precursor glass to the second nucleation temperature. As will be described subsequently in more detail, in other embodiments, the precursor glass may be heated to produce a pre-nucleated crystallizable glass composition, which is then formed into the initial 3D shape.

For some embodiments described herein, it is desirable to complete 3D forming while the article has a viscosity from $10^{7.6}$ poise to $10^{9.9}$ poise, or within subranges as described herein. This viscosity range is sufficiently viscous that it can be formed into desired shapes, while not being so viscous that the shape is easily lost. One factor that heavily influences viscosity is temperature. For the materials described herein, in the absence of changing crystallinity, viscosity generally decreases with increasing temperature. But, another factor that heavily influences viscosity is crystallinity. Higher viscosity correlates with higher crystallinity. Crystallinity increases as crystals form and grow over time with thermal treatment. The rate of crystal formation, as opposed to the absolute amount of crystal, generally increases with increasing temperature. So, there is a process window during which the viscosity, which is a function of both temperature and thermal history, is desirable for 3D forming. As described herein, this window may occur during or after what is described as pre-nucleating, but before nucleating. There are two particularly favorable process windows. One occurs during pre-nucleation at a first nucleation temperature. The article has a relatively low crystallinity at this point, so 3D forming may occur at relatively low temperature. Another favorable process window occurs after pre-nucleation, while the article is being heated to a second nucleation temperature higher than the first nucleation temperature. This heating temporarily lowers the viscosity of the article due to the temperature dependence of viscosity, creating a process window for 3D forming. But, increased viscosity due to crystallization once the second nucleating temperature is reached can rapidly close this window.

In embodiments, the first nucleation temperature can be in a range from 500° C. to 650° C. (for example, 500° C., 510° C., 520° C., 530° C., 540° C., 550° C., 560° C., 570° C., 580° C., 590° C., 600° C., 610° C., 620° C., 630° C., 640° C., or 650° C.) and all ranges and subranges therebetween. In embodiments, the first nucleation temperature may be from 500° C. to 640° C., from 500° C. to 620° C., from 500° C. to 600° C., from 500° C. to 580° C., from 500° C. to 560° C., from 500° C. to 540° C., from 500° C. to 520° C., from 520° C. to 650° C., from 520° C. to 640° C., from 520° C. to 620° C., from 520° C. to 600° C., from 520° C. to 580° C., from 520° C. to 560° C., from 520° C. to 540° C., from 540° C. to 650° C., from 540° C. to 640° C., from 540° C. to 620° C., from 540° C. to 600° C., from 540° C. to 580° C., from 540° C. to 560° C., from 560° C. to 650° C., from 560° C. to 640° C., from 560° C. to 620° C., from 560° C. to 600° C., from 560° C. to 580° C., from 580° C. to 650° C., from 580° C. to 640° C., from 580° C. to 620° C., from 580° C. to 600° C., from 600° C. to 650° C., from 600° C. to 640° C., from 600° C. to 620° C., from 620° C. to 650° C., from 620° C. to 640° C., or from 640° C. to 650° C.

In embodiments, the heating rate from room temperature to the first nucleation temperature may vary. In embodiments, the heating rate from room temperature to the first nucleation temperature may be in a range from 0.01° C./min to 50° C./min, 0.01° C./min, 0.1° C./min, 0.5° C./min, 1° C./min, 2° C./min, 3° C./min, 4° C./min, 5° C./min, 10° C./min, 15° C./min, 20° C./min, 25° C./min, 30° C./min, 40° C./min, 45° C./min, 50° C./min, and all ranges and subranges therebetween. In embodiments, the heating rate from room temperature to the first nucleation temperature may be from 0.01° C./min to 50° C./min, from 0.01° C./min to 40° C./min, from 0.01° C./min to 30° C./min, from 0.01° C./min to 20° C./min, from 0.01° C./min to 10° C./min, from 0.01° C./min to 5° C./min, from 0.01° C./min to 1° C./min, from 0.01° C./min to 0.1° C./min, from 0.1° C./min to 50° C./min, from 0.1° C./min to 40° C./min, from 0.1° C./min to 30° C./min, from 0.1° C./min to 20° C./min, from 0.1° C./min to 10° C./min, from 0.1° C./min to 5° C./min, from 0.1° C./min to 1° C./min, from 1° C./min to 50° C./min, from 1° C./min to 40° C./min, from 1° C./min to 30° C./min, from 1° C./min to 20° C./min, from 1° C./min to 10° C./min, from 1° C./min to 5° C./min, from 5° C./min to 50° C./min, from 5° C./min to 40° C./min, from 5° C./min to 30° C./min, from 5° C./min to 20° C./min, from 5° C./min to 10° C./min, from 10° C./min to 50° C./min, from 10° C./min to 40° C./min, from 10° C./min to 30° C./min, from 10° C./min to 20° C./min, from 20° C./min to 50° C./min, from 20° C./min to 40°

C./min, from 20° C./min to 30° C./min, from 30° C./min to 50° C./min, from 30° C./min to 40° C./min, or from 40° C./min to 50° C./min.

In embodiments, the pre-nucleating time period for maintaining the first nucleation temperature can be in a range from 1 minute to 16 hours (for example 1 minute, 5 minutes, 10 minutes, 20 minutes, 30 minutes, 40 minutes, 50 minutes, 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, or 16 hours) and all ranges and subranges therebetween. In embodiments, the pre-nucleating time period for maintaining the first nucleation temperature can be in a range from 1 minute to 16 hours, from 1 minute to 15 hours, from 1 minute to 10 hours, from 1 minute to 5 hours, from 1 minute to 1 hour, from 1 minute to 30 minutes, from 30 minutes to 16 hours, from 30 minutes to 15 hours, from 30 minutes to 10 hours, from 30 minutes to 5 hours, from 30 minutes to 1 hour, from 1 hour to 16 hours, from 1 hour to 15 hours, from 1 hour to 10 hours, from 1 hour to 5 hours, from 5 hours to 16 hours, from 5 hours to 15 hours, from 5 hours to 10 hours, from 10 hours to 16 hours, from 10 hours to 15 hours, or from 15 hours to 16 hours.

Once the first nucleation temperature has been reached, the pre-nucleating time period may be determined by monitoring viscosity. In embodiments, the pre-nucleated crystallizable glass composition may have a viscosity, measured at the first nucleation temperature, from $10^{7.6}$ poise to $10^{9.9}$ poise, $10^8$ poise to $10^{9.9}$ poise, from $10^8$ poise to $10^{9.5}$ poise, from $10^8$ poise to $10^{9.0}$ poise, from $10^8$ poise to $10^{8.5}$ poise, from $10^{8.5}$ poise to $10^{9.9}$ poise, from $10^{8.5}$ poise to $10^{9.5}$ poise, from $10^{8.5}$ poise to $10^{9.0}$ poise, from $10^{9.0}$ poise to $10^{9.9}$ poise, from $10^{9.0}$ poise to $10^{9.5}$ poise, or from $10^{9.5}$ poise to $10^{9.9}$ poise, and all ranges and subranges therebetween. As stated previously, viscosity of the pre-nucleated glass composition may allow it to be formed into a 3D shape. In embodiments, the pre-nucleating time period may end once the pre-nucleated glass composition has a viscosity greater than $10^{9.9}$ poise, measured at the first nucleation temperature.

Nucleating the precursor glass composition to the first nucleation temperature and maintaining the first nucleation temperature for the pre-nucleating time period produces a pre-nucleated crystallizable glass composition. As used herein, a pre-nucleated crystallizable glass composition is a composition having a crystalline phase content up to 20 wt %. Without being bound by theory, it is believed that by varying the holding time (the pre-nucleating time period) at the pre-nucleation stage, this relatively low level of crystallinity (up to 20 wt %) can be achieved. The presence of a crystalline phase up to 20 wt % may provide a pre-nucleated glass composition having a viscosity less than $10^{10}$ poise, which may be formed into a 3D shape. At viscosities above $10^{10}$ poise, forming a 3D shape may be challenging at temperatures below 800° C. In embodiments, the pre-nucleated crystallizable glass composition may have a weight percentage of crystals in a range from 5 wt % to 20 wt %, from 5 wt % to 15 wt %, from 5 wt % to 10 wt %, from 10 wt % to 20 wt %, from 10 wt % to 15 wt %, or from 15 wt % to 20 wt %, and all ranges and subranges therebetween. In embodiments, the pre-nucleated crystallizable glass composition may have a weight percentage of crystals greater than 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %.

A 3D formable pre-nucleated sheet may be formed by cooling the pre-nucleated crystallizable glass composition to room temperature. In embodiments, the 3D formable pre-nucleated sheet may be formed into the initial 3D shape. In embodiments the 3D formable pre-nucleated sheet may later be further nucleated and cerammed. Without being bound by theory, producing a 3D glass-ceramic article by utilizing a 3D formable pre-nucleated sheet may maintain desired surface quality while minimizing distortion of the 3D shape. As used herein, "3D formable" means that the sheet is capable of being formed into a 3D shape as described herein, and meets the viscosity specifications described herein, i.e., the pre-nucleated sheet has viscosity sufficiently low that it may be 3D formed at a suitable forming temperature—this generally does not occur if crystallinity is too high.

In embodiments, the 3D formable pre-nucleated sheet has a thickness in a range from 0.2 mm to 4.0 mm, 0.2 mm to 3.0 mm, 0.2 mm to 2.0 mm, 0.2 mm to 1.5 mm, 0.2 mm to 1.0 mm, 0.2 mm to 0.9 mm, 0.2 mm to 0.8 mm, 0.2 mm to 0.7 mm, 0.2 mm to 0.6 mm, 0.2 mm to 0.5 mm, 0.3 mm to 4.0 mm, 0.3 mm to 3.0 mm, 0.3 mm to 2.0 mm, 0.3 mm to 1.5 mm, 0.3 mm to 1.0 mm, 0.3 mm to 0.9 mm, 0.3 mm to 0.8 mm, 0.3 mm to 0.7 mm, 0.3 mm to 0.6 mm, 0.3 mm to 0.5 mm, 0.4 mm to 4.0 mm, 0.4 mm to 3 mm, 0.4 mm to 2.0 mm, 0.4 mm to 1.5 mm, 0.4 mm to 1.0 mm, 0.4 mm to 0.9 mm, 0.4 mm to 0.8 mm, 0.4 mm to 0.7 mm, 0.4 mm to 0.6 mm, 0.5 mm to 4.0 mm, 0.5 mm to 3.0 mm, 0.5 mm to 2.0 mm, 0.5 mm to 1.5 mm, 0.5 mm to 1.0 mm, 0.5 mm to 0.9 mm, 0.5 mm to 0.8 mm, 0.5 mm to 0.7 mm, 0.8 mm to 4 mm, 0.8 mm to 3.0 mm, 0.8 mm to 2.0 mm, 0.8 mm to 1.5 mm, 0.8 mm to 1.0 mm, 1.0 mm to 2.0 mm, 1.0 mm to 1.5 mm, and all ranges and subranges therebetween. In embodiments, the 3D formable pre-nucleated sheet may be shaped, for example it may have a 2.5D or 3D shape. In embodiments, the 3D formable pre-nucleated sheet may have a uniform thickness, or 3D formable pre-nucleated sheet may not have a uniform thickness.

In embodiments, the pre-nucleated crystallizable glass composition may be formed into an initial 3D shape without cooling to room temperature. In embodiments, forming the pre-nucleated crystallizable glass composition into the initial 3D shape may occur before further nucleating the pre-nucleated crystallizable glass composition. In other embodiments, the pre-nucleated crystallizable glass composition may be formed into the initial 3D shape simultaneously while nucleating the pre-nucleated crystallizable glass composition as described subsequently herein. The initial 3D shape may be formed using one or more of a pressing process, a sagging process, a rolling process, or a molding process.

Further nucleating the pre-nucleated crystallizable glass composition at one or more preselected temperatures for one or more preselected times to induce glass homogenization and crystallization (i.e., nucleation and growth) of crystalline phases (e.g., having one or more compositions, amounts, morphologies, sizes or size distributions, etc.) forms the nucleated crystallizable glass composition. Further nucleating the pre-nucleated crystallizable glass composition may include heating the pre-nucleated crystallizable glass composition at the one or more preselected temperatures, including the second nucleation temperature, for one or more preselected times, including the nucleating time period.

In embodiments, the second nucleation temperature can be in a range from 500° C. to 750° C. (for example, 500° C., 510° C., 520° C., 530° C., 540° C., 550° C., 560° C., 570° C., 580° C., 590° C., 600° C., 610° C., 620° C., 630° C., 640° C., 650° C., 670° C., 680° C., 690° C., 700° C., 710° C., 720° C., 730° C., 740° C., or 750° C.). In embodiments, the first nucleation temperature may be from 500° C. to 750°

C., from 500° C. to 700° C., from 500° C. to 650° C., from 500° C. to 600° C., from 500° C. to 550° C., from 550° C. to 750° C., from 550° C. to 700° C., from 550° C. to 650° C., from 550° C. to 600° C., from 600° C. to 750° C., from 600° C. to 700° C., from 600° C. to 650° C., from 650° C. to 750° C., from 650° C. to 700° C., or from 700° C. to 750° C.

In embodiments, the heating rate from the first nucleation temperature or room temperature to the second nucleation temperature may vary. In embodiments, the heating rate from the first nucleation temperature or room temperature to the second nucleation temperature may be in a range from 0.01° C./min to 50° C./min, 0.01° C./min, 0.1° C./min, 0.5° C./min, 1° C./min, 2° C./min, 3° C./min, 4° C./min, 5° C./min, 10° C./min, 15° C./min, 20° C./min, 25° C./min, 30° C./min, 40° C./min, 45° C./min, 50° C./min, and all ranges and subranges therebetween. In embodiments, the heating rate from the first nucleation temperature or room temperature to the second nucleation temperature may be from 0.01° C./min to 50° C./min, from 0.01° C./min to 40° C./min, from 0.01° C./min to 30° C./min, from 0.01° C./min to 20° C./min, from 0.01° C./min to 10° C./min, from 0.01° C./min to 5° C./min, from 0.01° C./min to 1° C./min, from 0.01° C./min to 0.1° C./min, from 0.1° C./min to 50° C./min, from 0.1° C./min to 40° C./min, from 0.1° C./min to 30° C./min, from 0.1° C./min to 20° C./min, from 0.1° C./min to 10° C./min, from 0.1° C./min to 5° C./min, from 0.1° C./min to 1° C./min, from 1° C./min to 50° C./min, from 1° C./min to 40° C./min, from 1° C./min to 30° C./min, from 1° C./min to 20° C./min, from 1° C./min to 10° C./min, from 1° C./min to 5° C./min, from 5° C./min to 50° C./min, from 5° C./min to 40° C./min, from 5° C./min to 30° C./min, from 5° C./min to 20° C./min, from 5° C./min to 10° C./min, from 10° C./min to 50° C./min, from 10° C./min to 40° C./min, from 10° C./min to 30° C./min, from 10° C./min to 20° C./min, from 20° C./min to 50° C./min, from 20° C./min to 40° C./min, from 20° C./min to 30° C./min, from 30° C./min to 50° C./min, from 30° C./min to 40° C./min, or from 40° C./min to 50° C./min.

In embodiments, the second predetermined time for maintaining the second nucleation temperature, or the nucleating time period, can be in a range from 1 minute to 6 hours (for example 1 minute, 5 minutes, 10 minutes, 20 minutes, 30 minutes, 40 minutes, 50 minutes, 60 minutes, 90 minutes, 120 minutes, 150 minutes, 180 minutes, 210 minutes, 240 minutes, 270 minutes, 300 minutes, 330 minutes, or 360 minutes) and all ranges and subranges therebetween. In embodiments, the second predetermined time for maintaining the crystallization temperature can be in a range from 1 minute to 4 hours (for example 1 minute, 5 minutes, 10 minutes, 20 minutes, 30 minutes, 40 minutes, 50 minutes, 60 minutes, 90 minutes, 120 minutes, 150 minutes, 180 minutes, 210 minutes, 240 minutes) and all ranges and subranges therebetween. In embodiments, the nucleating time period may be from 1 minute to 6 hours, from 1 minute to 5 hours, from 1 minute to 4 hours, from 1 minute to 3 hours, from 1 minute to 2 hours, from 1 minute to 1 hour, from 1 minute to 30 minutes, from 30 minutes to 6 hours, from 30 minutes to 5 hours, from 30 minutes to 4 hours, from 30 minutes to 3 hours, from 30 minutes to 2 hours, from 30 minutes to 1 hour, from 1 hour to 6 hours, from 1 hour to 5 hours, from 1 hour to 4 hours, from 1 hour to 3 hours, from 1 hour to 2 hours, from 2 hours to 6 hours, from 2 hours to 5 hours, from 2 hours to 4 hours, from 2 hours to 3 hours, from 3 hours to 6 hours, from 3 hours to 5 hours, from 3 hours to 4 hours, from 4 hours to 6 hours, from 4 hours to 5 hours, or from 5 hours to 6 hours.

In embodiments, there may be one or more additional temperature holds between nucleating the pre-nucleated crystallizable glass composition and ceramming the nucleated crystallizable glass composition to produce the glass-ceramic article. Thus, in embodiments, after maintaining the article at the second nucleation temperature, the article may be heated to one or more intermediate temperatures (wherein the intermediate temperatures are in a range between the nucleation temperature and the crystallization temperature) and held at the one or more intermediate temperatures for a predetermined time (for example, between 1 hour and 4 hours and all ranges and subranges therebetween) and then cerammed. In embodiments, once the article is heated to the second nucleation temperature, the article is not maintained at the second nucleation temperature but instead is continuously heated until the crystallization temperature is reached.

In embodiments, the heating rate from the second nucleation temperature to the crystallization temperature or the second nucleation temperature to the intermediate temperature and/or the heating rate from the intermediate temperature to the crystallization temperature may vary. In embodiments where there are multiple intermediate temperatures, the heating rate between the individual intermediate temperatures may also vary. In embodiments, the heating rate from the second nucleation temperature to the crystallization temperature or the second nucleation temperature to the intermediate temperature and/or the heating rate from the intermediate temperature to the crystallization temperature may be in a range from 0.01° C./min to 50° C./min, 0.01° C./min, 0.1° C./min, 0.5° C./min, 1° C./min, 2° C./min, 3° C./min, 4° C./min, 5° C./min, 10° C./min, 15° C./min, 20° C./min, 25° C./min, 30° C./min, 40° C./min, 45° C./min, 50° C./min, and all ranges and subranges therebetween. In embodiments, the heating rate from the second nucleation temperature to the crystallization temperature or the second nucleation temperature to the intermediate temperature and/or the heating rate from the intermediate temperature to the crystallization temperature may be from 0.01° C./min to 50° C./min, from 0.01° C./min to 40° C./min, from 0.01° C./min to 30° C./min, from 0.01° C./min to 20° C./min, from 0.01° C./min to 10° C./min, from 0.01° C./min to 5° C./min, from 0.01° C./min to 1° C./min, from 0.01° C./min to 0.1° C./min, from 0.1° C./min to 50° C./min, from 0.1° C./min to 40° C./min, from 0.1° C./min to 30° C./min, from 0.1° C./min to 20° C./min, from 0.1° C./min to 10° C./min, from 0.1° C./min to 5° C./min, from 0.1° C./min to 1° C./min, from 1° C./min to 50° C./min, from 1° C./min to 40° C./min, from 1° C./min to 30° C./min, from 1° C./min to 20° C./min, from 1° C./min to 10° C./min, from 1° C./min to 5° C./min, from 5° C./min to 50° C./min, from 5° C./min to 40° C./min, from 5° C./min to 30° C./min, from 5° C./min to 20° C./min, from 5° C./min to 10° C./min, from 10° C./min to 50° C./min, from 10° C./min to 40° C./min, from 10° C./min to 30° C./min, from 10° C./min to 20° C./min, from 20° C./min to 50° C./min, from 20° C./min to 40° C./min, from 20° C./min to 30° C./min, from 30° C./min to 50° C./min, from 30° C./min to 40° C./min, or from 40° C./min to 50° C./min.

In embodiments, the nucleated crystallizable glass composition may be cerammed to a crystallization temperature and maintained at the ceramming temperature for a crystallization time period to produce the glass-ceramic article. In embodiments, the crystallization temperature may be from 650° C. to 900° C., from 650° C. to 850° C., from 650° C. to 800° C., from 650° C. to 750° C., from 650° C. to 700° C., from 700° C. to 900° C., from 700° C. to 850° C., from 700° C. to 800° C., from 700° C. to 750° C., from 750° C.

to 900° C., from 750° C. to 850° C., from 750° C. to 800° C., from 800° C. to 900° C., from 800° C. to 850° C. or from 850° C. to 900° C.

In embodiments, the crystallization temperature may depend on whether a transparent or translucent/opaque glass-ceramic is desired. A crystallization temperature of from 650° C. to 790° C. or below will result in a transparent glass-ceramic and a crystallization temperature above 790° C. will result in a translucent/opaque glass-ceramic. In embodiments, the glass can be heated from room temperature to a nucleation temperature of 570° C. at a rate of 5° C./min, maintained at the nucleation temperature for 4 hours, then heated to the crystallization temperature of 740° C. at a rate of 5° C./min, and maintained at the crystallization temperature for 1 hour.

In embodiments, the predetermined time for maintaining the crystallization temperature, or the crystallization time period, can be in a range from 1 minute to 4 hours (for example 1 minute, 5 minutes, 10 minutes, 20 minutes, 30 minutes, 40 minutes, 50 minutes, 1 hour, 1.5 hours, 2 hours, 2.5 hours, 3 hours, 3.5 hours, or 4 hours) and all ranges and subranges therebetween. In embodiments, the crystallization time period may be from 1 minute to 4 hours, from 1 minute to 3 hours, from 1 minute to 2 hours, from 1 minute to 1 hour, from 1 minute to 30 minutes, from 1 minute to 10 minutes, or from 1 minute to 5 minutes.

In embodiments, the glass-ceramic article is cooled after being held at the crystallization temperature. In embodiments, the glass-ceramic article may be cooled to room temperature in a single stage at a constant cooling rate, in two stages each with a different cooling rate, or in three or more stages each with a different cooling rate. In embodiments, the glass-ceramic articles are cooled at a controlled rate from the crystallization temperature in order to minimize temperature gradients across the articles as well as minimize residual stress across the articles. Temperature gradients and differences in residual stress may lead to the articles warping during cooling. Thus, controlling the cooling may mitigate temperature gradients and residuals stresses, which may also minimize warpage of the glass-ceramic articles.

Figure 2:
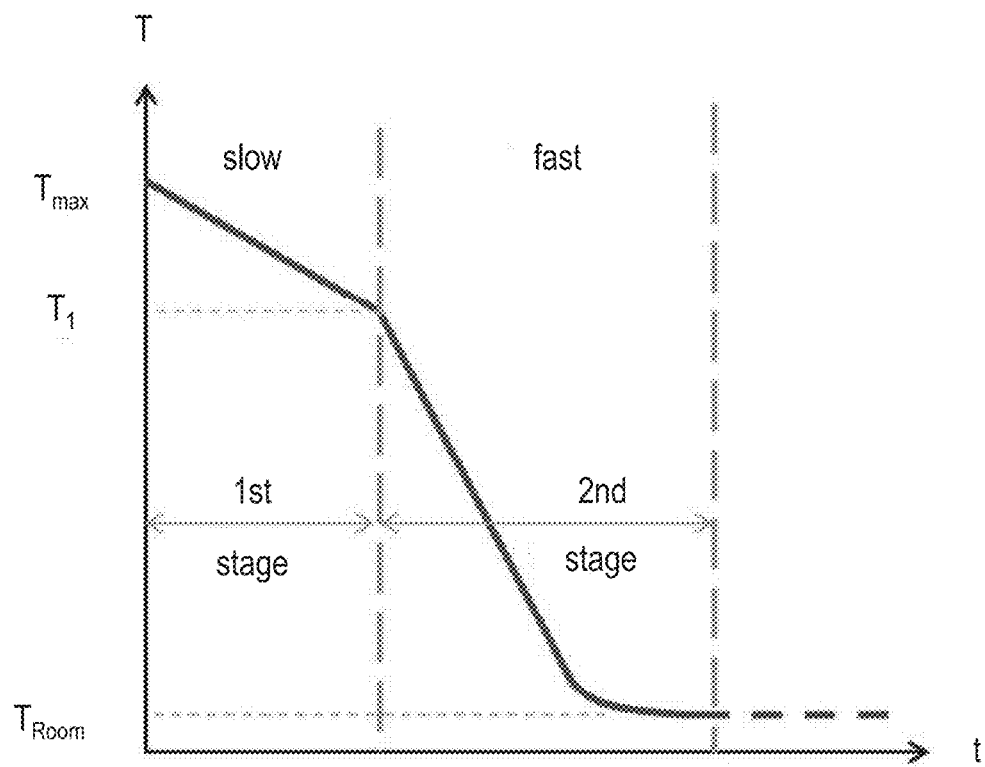
FIG. 2 is an exemplary diagram of a cooling cycle.

In embodiments, as shown for example in FIG. 2, cooling may occur in two cooling stages. In such embodiments, in the first cooling stage, the temperature cools from $T_{max}$ (i.e., $T_C$ the crystallization temperature) to $T_1$ at a first cooling rate. In the second cooling stage, the temperature cools from $T_1$ to room temperature ($T_{Room}$) at a second cooling rate. As shown in FIG. 2, the first cooling rate is lower than the second cooling rate. The first cooling rate during the first stage is low to minimize the temperature gradient across the glass-ceramic article. In embodiments, the temperature $T_1$ where the transition from the first cooling stage to the second cooling stage occurs is determined based on the temperature below which the glass-ceramic article behaves as an elastic material. Without be bound by theory, it is believed that the lower cooling rate of the first cooling stage is only needed to control the temperature gradients until the glass-ceramic article reaches the temperature below which it behaves as an elastic material. In embodiments, temperature $T_1$ may be in a range from 450° C. to 550° C. and all ranges and subranges therebetween. In embodiments, temperature $T_1$ may be less than or equal to 550° C., 540° C., 530° C., 520° C., 510° C., 500° C., 490° C., 480° C., 470° C., 460° C., or 450° C. In embodiments, the temperature drop in the first cooling stage ($T_{max}$ $T_1$) is less than the temperature drop in the second cooling stage ($T_1 T_{room}$. Without be bound by theory, it is believed that temperature gradients that develop in the first cooling stage have a greater effect on the residual stresses (and therefore warp) in the glass-ceramic article upon reaching room temperature (in the form of optical retardance) than temperature gradients that develop in the second cooling stage. Thus, in embodiments, after controlled cooling in the first cooling stage, the glass-ceramic article may be allowed to cool to room temperature in an uncontrolled cooling environment.

Figure 3:
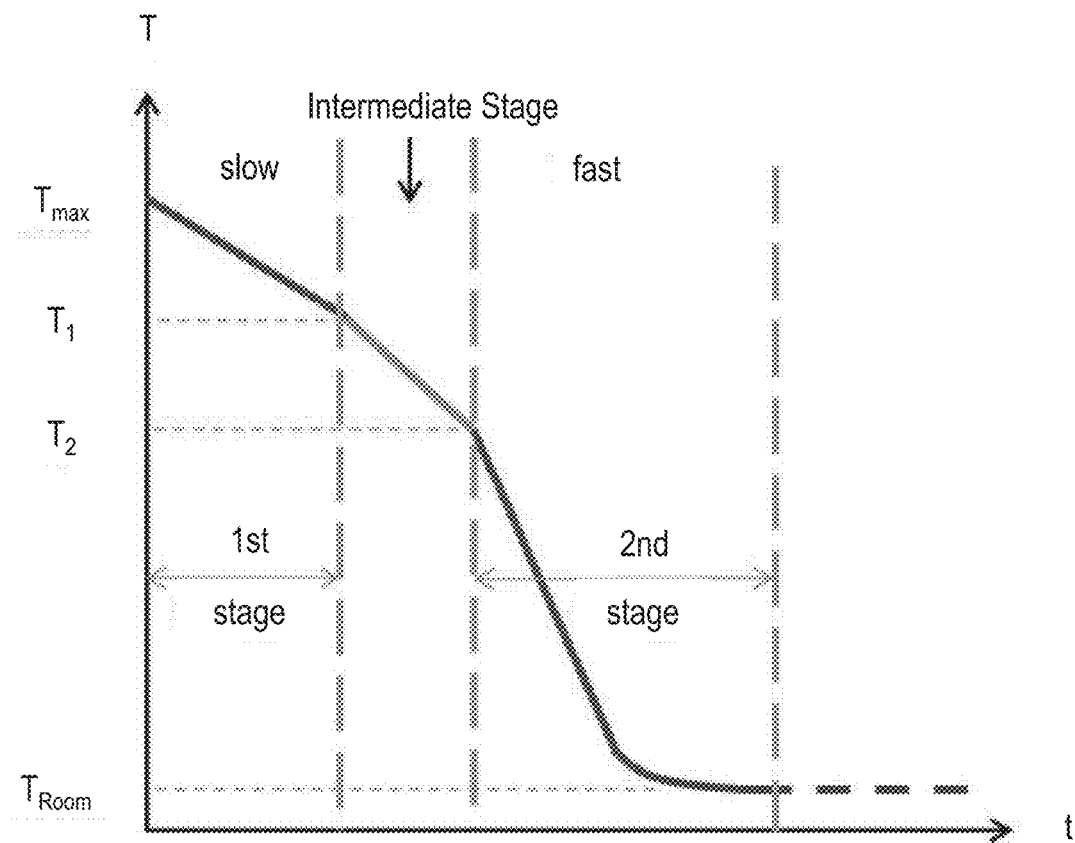
FIG. 3 is an exemplary diagram of another cooling cycle.

In embodiments, as shown for example in FIG. 3, the cooling cycle may have an intermediate cooling stage in between the first cooling stage and the second cooling stage for a total of three cooling stages. In such embodiments, in the first cooling stage, the temperature cools from $T_{max}$ (i.e., $T_C$ the crystallization temperature) to $T_1$ at a first cooling rate. In the intermediate cooling stage, the temperature cools from $T_1$ to $T_2$ at a second cooling rate. In the second cooling stage, the temperature cools from $T_2$ to room temperature ($T_{Room}$) at a third cooling rate. As shown in FIG. 3, the cooling rate increases with each stage such that (i) the first cooling rate during the first cooling stage is less than the second cooling rate during the intermediate cooling stage and less than the third cooling rate during the second cooling stage and (ii) the second cooling rate during the intermediate cooling stage is less than the third cooling rate during the second cooling stage. In embodiments, (i) the temperature drop in the first cooling stage ($T_{max}$ $T_1$) is less than the temperature drop in the intermediate cooling stage ($T_1$ $T_2$) and the temperature drop in the second cooling stage ($T_2$ $T_{Room}$) and (ii) the temperature drop in the intermediate cooling stage ($T_1$ $T_2$) is less than the temperature drop in the second cooling stage ($T_2$ $T_{Room}$). The intermediate cooling stages allow for a faster cooling cycle while still minimizing temperature gradients and residual stress. In embodiments, T. may be 740° C., $T_1$ may be 640° C., and $T_2$ may be 580° C.

In embodiments having multiple cooling stages in the cooling cycle, the temperature gradients across the glass-ceramic article during the first cooling stage may be less than 15° C., less than 14° C., less than 13° C., less than 12° C., less than 11° C., less than 10° C., less than 9° C., less than 8° C., less than 7° C., less than 6° C., less than 5° C., less than 4° C., or less than 3° C. in embodiments, the temperature gradients across the glass-ceramic article during the first cooling stage may be from 3° C. to 15° C., from 3° C. to 12° C., from 3° C. to 9° C., from 3° C. to 6° C., from 6° C. to 15° C., from 6° C. to 12° C., from 6° C. to 9° C., from 9° C. to 15° C., from 9° C. to 12° C., or from 12° C. to 15° C.

In embodiments having multiple cooling stages in the cooling cycle, the optical retardance at room temperature may be less than 15 nm/mm of thickness, less than 14 nm/mm of thickness, less than 13 nm/mm of thickness, less than 12 nm/mm of thickness, less than 11 nm/mm of thickness, less than 10 nm/mm of thickness, less than 9 nm/mm of thickness, less than 8 nm/mm of thickness, less than 7 nm/mm of thickness, less than 6 nm/mm of thickness, less than 5 nm/mm of thickness, less than 4 nm/mm of thickness, or less than 3 nm/mm of thickness. The optical retardation may be measured according to ASTM F218-13.

Upon performing the above methods for forming 3D glass-ceramics, the resultant glass-ceramic has one or more crystalline phases and a residual glass phase. In embodiments, the glass-ceramic contains the following exemplary crystalline phases: lithium disilicate, petalite, β-spodumene solid solution, β-quartz solid solution, lithium metasilicate, virgilite, cristobalite, lithium phosphate, baddeleyite and zirconia and any combinations thereof.

In embodiments, lithium disilicate is the crystalline phase with the highest weight percentage. Lithium disilicate, $Li_2Si_2O_5$, is an orthorhombic crystal based on corrugated sheets of $\{Si_2O_5\}$ tetrahedral arrays. The crystals are typically tabular or lath-like in shape, with pronounced cleavage planes. Glass-ceramics based on lithium disilicate offer highly desirable mechanical properties, including high body strength and fracture toughness, due to their microstructures of randomly-oriented interlocked crystals a crystal structure that forces cracks to propagate through the material via tortuous paths around these crystals. In embodiments, the weight percentage of the lithium disilicate crystalline phase in the glass-ceramic compositions can be in a range from 20 to 60 wt %, 20 to 55 wt %, 20 to 50 wt %, 20 to 45 wt %, 20 to 40 wt %, 20 to 35 wt %, 20 to 30 wt %, 20 to 25 wt %, 25 to 60 wt %, 25 to 55 wt %, 25 to 50 wt %, 25 to 45 wt %, 25 to 40 wt %, 25 to 35 wt %, 25 to 30 wt %, 30 to 60 wt %, 30 to 55 wt %, 30 to 50 wt %, 30 to 45 wt %, 30 to 40 wt %, 30 to 35 wt %, 35 to 60 wt %, 35 to 55 wt %, 35 to 50 wt %, 35 to 45 wt %, 35 to 40 wt %, 40 to 60 wt %, 40 to 55 wt %, 40 to 50 wt %, 40 to 45 wt %, 45 to 60 wt %, 45 to 55 wt %, 45 to 50 wt %, 50 to 60 wt %, 50 to 55 wt %, or 55 to 60 wt %. In embodiments, the glass-ceramic has 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt % lithium disilicate crystalline phase.

In embodiments, petalite is the crystalline phase with the highest weight percentage. Petalite, $LiAlSi_4O_{10}$, is a monoclinic crystal possessing a three-dimensional framework structure with a layered structure having folded $Si_2O_5$ layers linked by Li and Al tetrahedra. The Li is in tetrahedral coordination with oxygen. The mineral petalite is a lithium source and is used as a low thermal expansion phase to improve the thermal downshock resistance of glass-ceramic or ceramic parts. Moreover, glass-ceramic articles based on the petalite phase can be chemically strengthened in a salt bath, during which $Na^+$ (and/or $K^+$) replaces $Li^+$ in the petalite structure, which causes surface compression and strengthening. In embodiments, the weight percentage of the petalite crystalline phase in the glass-ceramic compositions can be in a range from 20 to 70 wt %, 20 to 65 wt %, 20 to 60 wt %, 20 to 55 wt %, 20 to 50 wt %, 20 to 45 wt %, 20 to 40 wt %, 20 to 35 wt %, 20 to 30 wt %, 20 to 25 wt %, 25 to 70 wt %, 25 to 65 wt %, 25 to 60 wt %, 25 to 55 wt %, 25 to 50 wt %, 25 to 45 wt %, 25 to 40 wt %, 25 to 35 wt %, 25 to 30 wt %, 30 to 70 wt %, 30 to 65 wt %, 30 to 60 wt %, 30 to 55 wt %, 30 to 50 wt %, 30 to 45 wt %, 30 to 40 wt %, 30 to 35 wt %, 35 to 70 wt %, 35 to 65 wt %, 35 to 60 wt %, 35 to 55 wt %, 35 to 50 wt %, 35 to 45 wt %, 35 to 40 wt %, 40 to 70 wt %, 40 to 65 wt %, 40 to 60 wt %, 40 to 55 wt %, 40 to 50 wt %, 40 to 45 wt %, 45 to 70 wt %, 45 to 65 wt %, 45 to 60 wt %, 45 to 55 wt %, 45 to 50 wt %, 50 to 70 wt %, 50 to 65 wt %, 50 to 60 wt %, 50 to 55 wt %, 55 to 70 wt %, 55 to 65 wt %, 55 to 60 wt %, 60 to 70 wt %, 60 to 65 wt %, or 65 to 70 wt %. In embodiments, the glass-ceramic has 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt % petalite crystalline phase.

In embodiments, the crystalline phases other than lithium disilicate and petalite are present in the glass-ceramic article in amounts less than 5 wt %, less than 4 wt %, less than 3 wt %, less than 2 wt %, or less than 1 wt %.

In embodiments, the glass-ceramic has a residual glass content of 5 to 50 wt %, 5 to 45 wt %, 5 to 40 wt %, 5 to 35 wt %, 5 to 30 wt %, 5 to 25 wt %, 5 to 20 wt %, 5 to 15 wt % 5 to 10 wt %, 10 to 50 wt %, 10 to 45 wt %, 10 to 40 wt %, 10 to 35 wt %, 10 to 30 wt %, 10 to 25 wt %, 10 to 20 wt %, 10 to 15 wt %, 15 to 50 wt %, 15 to 45 wt %, 15 to 40 wt %, 15 to 35 wt %, 15 to 30 wt %, 15 to 25 wt %, 15 to 20 wt %, 20 to 50 wt %, 20 to 45 wt %, 20 to 40 wt %, 20 to 35 wt %, 20 to 30 wt % 20 to 25 wt %, 25 to 30 wt %, and all ranges and subranges therebetween.

In embodiments the residual glass content can be less than or equal to 50, 45, 40, 35, 30, 25, 20, 19, 18, 17, 16, 15, 14, 13, 12, 11, 10, 9, 8, 7, 6, 5, 4, 3, 2, or 1 wt %. In embodiments, the crystalline phase may have a weight percentage of crystals in a range from greater than 20 wt % to 100 wt %, greater than 20 wt % to 90 wt %, greater than 20 wt % to 80 wt %, greater than 20 wt % to 70 wt %, 30 wt % to 100 wt %, 30 wt % to 90 wt %, 30 wt % to 80 wt %, 30 wt % to 70 wt %, 40 wt % to 100 wt %, 40 wt % to 90 wt %, 40 wt % to 80 wt %, 40 wt % to 70 wt %, 50 wt % to 100 wt %, 50 wt % to 90 wt %, 50 wt % to 80 wt %, 50 wt % to 70 wt %, and all ranges and subranges therebetween. In embodiments, the inner CS region may have a weight percentage of crystals greater than 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, or 90 wt %.

The grain size of the crystals in the crystalline phases is a factor that affects the transparency of the glass-ceramic. In embodiments, the grains have a longest dimension in a range from 5 nm to 150 nm, 5 nm to 125 nm, 5 nm to 100 nm, 5 nm to 75 nm, 5 nm to 50 nm, 25 nm to 150 nm, 25 nm to 125 nm, 25 nm to 100 nm, 25 nm to 75 nm, 50 nm to 150 nm, 50 nm to 125 nm, 50 nm to 100 nm, and all ranges and subranges therebetween. In embodiments, the longest dimension of the grains is less than 150 nm, less than 125 nm, less than 100 nm, less than 75 nm, less than 50 nm, or less than 25 nm. The longest dimension of the grains is measured using a scanning electron microscope (SEM).

In embodiments, the phase assemblage and heat treatment conditions are chosen to create a glass-ceramic article with suitable optical properties, such as transparency and low haze, for use as a cover glass for a mobile electronic device. In embodiments, the glass-ceramic article is transparent in that it has an average transmittance of 85% or greater, 86% or greater, 87% or greater, 88% or greater, 89% or greater, 90% or greater, 91% or greater, 92% or greater, 93% or greater (including surface reflection losses) of light over the wavelength range from 450 nm to 600 nm for a glass-ceramic article having a thickness of 1 mm. In other embodiments, glass-ceramic may be translucent over the wavelength range from 450 nm to 600 nm. In embodiments, a translucent glass-ceramic can have an average transmittance in a range from 20% to less than 85% of light over the wavelength range of 450 nm to 800 nm for a glass-ceramic article having a thickness of 1 mm. In embodiments, the glass-ceramic article has a haze of less than 0.20, 0.19, 0.18, 0.17, 0.16, 0.15, 0.14, 0.13, 0.12, 0.11. or 0.10.

Equation (2) below estimates the haze of a glass-ceramic article based on the nucleation temperature (TN), the nucleation hold time (tN), the crystallization temperature (TC), and the crystallization hold time (tC).

$$\text{Estimated haze} = 103\ 0.260 T_N + 0.000203 (T_N)^2 7.96 t_N + 0.1532 (t_N)^2 0.019 T_C 0.000008 (T_C)^2 10.03 t_C + 0.00597 T_N * t_N + 0.00463 t_N * T_C + 0.01342 T_C * t_C \quad (2)$$

In embodiments, the nucleation temperature (TN), the nucleation hold time (tN), the crystallization temperature (TC), and the crystallization hold time (tC) for the heat treatment cycle can be selected based on the estimated haze provide by Equation (2) to have an estimated haze of less than 0.2, 0.19, 0.18, 0.17, 0.16, 0.15, 0.14, 0.13, 0.12, 0.11, or 0.1. In embodiments, the heat treatment may include (i) heating precursor glasses at a rate of 0.01-50° C./min to a nucleation temperature (Tn); (ii) maintaining the crystallizable glasses at the nucleation temperature for first predetermined period of time ($t_N$) to produce a nucleated crystallizable glass compositions; (iii) heating the nucleated crystallizable glasses at a rate in the range from 0.01° C./min to 50° C./min to a crystallization temperature (Tc); (iv) maintaining the nucleated crystallizable glasses at the crystallization temperature for a second predetermined period of time ($t_C$) to produce the glass-ceramic articles described herein; and (v) cooling the formed glass-ceramic to room temperature, such that the value of Equation (2) is less than 0.2, 0.19, 0.18, 0.17, 0.16, 0.15, 0.14, 0.13, 0.12, 0.11, or 0.1.

As stated previously, forming the initial 3D shape according to the methods described herein may minimize distortion of the initial 3D shape while producing 3D glass-ceramic articles with desired surface quality. In embodiments, the dimensional control of the final 3D shape is within 0.1 mm of the original design specifications of the 3D shape.

Ion Exchange

In embodiments, the glass-ceramic article is capable of being chemically strengthened using one or more ion exchange techniques. In these embodiments, ion exchange can occur by subjecting one or more surfaces of such glass-ceramic article to one or more ion exchange mediums (for example molten salt baths), having a specific composition and temperature, for a specified time period to impart to the one or more surfaces with compressive stress layer(s). In embodiments, the ion exchange medium is a molten salt bath containing an ion (for example an alkali metal ion) that is larger than an ion (for example an alkali metal ion) present in the glass-ceramic article wherein the larger ion from the molten salt bath is exchanged with the smaller ion in the glass-ceramic article to impart a compressive stress in the glass-ceramic article, and thereby increases the strength of the glass-ceramic article.

In embodiments, a one-step ion exchange process can be used and in other embodiments, a multi-step ion exchange process can be used. In embodiments, for both one step and multi-step ion exchange processes the ion exchange mediums (for example, molten salt baths) can include 100 wt % of a sodium-containing salt (for example, $NaNO_3$) or can include a mixed salt bath, for example a combination of a sodium-containing salt (for example, $NaNO_3$) and a potassium-containing salt (for example $KNO_3$). In embodiments, the molten salt bath contains a sodium-containing salt (for example, $NaNO_3$) in a range from 3 wt % to 100 wt %, 3 wt % to 95 wt %, 3 wt % to 90 wt %, 3 wt % to 85 wt %, 3 wt % to 80 wt %, 3 wt % to 75 wt %, 5 wt % to 100 wt %, 5 wt % to 95 wt %, 5 wt % to 90 wt %, 5 wt % to 85 wt %, 5 wt % to 80 wt %, 5 wt % to 75 wt %, 10 wt % to 100 wt %, 10 wt % to 95 wt %, 10 wt % to 90 wt %, 10 wt % to 85 wt %, 10 wt % to 80 wt %, 10 wt % to 75 wt %, 20 wt % to 100 wt %, 20 wt % to 95 wt %, 20 wt % to 90 wt %, 20 wt % to 85 wt %, 20 wt % to 80 wt %, 20 wt % to 75 wt %, 30 wt % to 100 wt %, 30 wt % to 95 wt %, 30 wt % to 90 wt %, 30 wt % to 85 wt %, 30 wt % to 80 wt %, 30 wt % to 75 wt %, and all ranges and subranges therebetween. In embodiments, other sodium and potassium salts may be used in the ion exchange solution, such as, for example sodium or potassium nitrites, phosphates, or sulfates.

After an ion exchange process is performed, it should be understood that a composition at the surface of the glass-ceramic may be different than the composition of the as-formed glass-ceramic (i.e., the glass-ceramic before it undergoes an ion exchange process). This results from one type of alkali metal ion in the as-formed glass-ceramic, such as, for example $Li^+$ or $Na^+$, being replaced with larger alkali metal ions, such as, for example $Na^+$ or $K^+$, respectively. However, the composition of the glass-ceramic at or near the center of the depth of the glass-ceramic article will, in embodiments, still have the composition of the as-formed glass-ceramic.

End Products

The glass-ceramic articles disclosed herein may be incorporated into another article, such as an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc. for example for use an interior display cover, a window, or windshield), appliance articles, or any article that requires some transparency, scratch-resistance, abrasion resistance or a combination thereof.

EXAMPLES

Various embodiments will be further clarified by the following examples.

Example 1

In Example 1, crystallinity change was studied as a function of heat treatment time and temperature. Exemplary precursor glass and glass-ceramic compositions in mol % on a metal oxide basis, are listed in Table 1 below.

TABLE 1

| Composition | 1 | 2 | 3 | 4 | 5 | 6 |
| --- | --- | --- | --- | --- | --- | --- |
| $SiO_2$ (mol %) | 70.1 | 70.7 | 70.7 | 70.7 | 70.7 | 70.7 |
| $Al_2O_3$ (mol %) | 4.3 | 4.2 | 3.8 | 3.8 | 2.8 | 2.8 |
| $Li_2O$ (mol %) | 21.4 | 22.1 | 22.1 | 22.1 | 22.1 | 22.1 |
| $Na_2O$ (mol %) | 1.5 | 0 | 0.5 | 1 | 1 | 2 |
| $K_2O$ (mol %) | 0 | 0 | 0.75 | 0.75 | 0.75 | 0.75 |
| $P_2O_5$ (mol %) | 0.8 | 0.9 | 1.0 | 1.0 | 1.0 | 1.0 |
| $ZrO_2$ (mol %) | 1.8 | 2.0 | 3.0 | 3.0 | 4.0 | 4.0 |
| $SnO_2$ (mol %) | 0.1 | 0 | 0.1 | 0.1 | 0.1 | 0.1 |
| Internal Liquidus (° C.) | 1020 | 1100 | 1075 | 1050 | 1070 | 1065 |
| ηliq (poise) | 5486 | 2850 | 3343 | 3206 | 3004 | 2579 |
| Liquidus phase | Lithiophosphate | Zircon | Sogdianite | Sogdianite | Sogdianite/zircon | Zircon/sogdianite |
| Ceramming cycle | 560° C.-4 h/730° C.-1 h | 580° C.-4 h/750° C.-1 h | 580° C.-4 h/750° C.-1 h | 580° C.-4 h/750° C.-1 h | 580° C.-4 h/760° C.-1 h | 580° C.-4 h/750° C.-1 h |
| Phase assemblage | Petalite/lithium disilicate | Petalite/lithium disilicate | Petalite/lithium disilicate | Petalite/lithium disilicate | Petalite/lithium disilicate | Petalite/lithium disilicate |
| Residual glass (wt. %) | 15 | 12 | 27 | 29 | 40 | 45 |

In Example 1, Sample Composition 1 was heated from room temperature to approximately 600° C. at a heating rate of 5° C./min and held for 10 hours. Then the samples were heated to 700° C. at a heating rate of 5° C./min and held for 10 hours.

Figure 4:
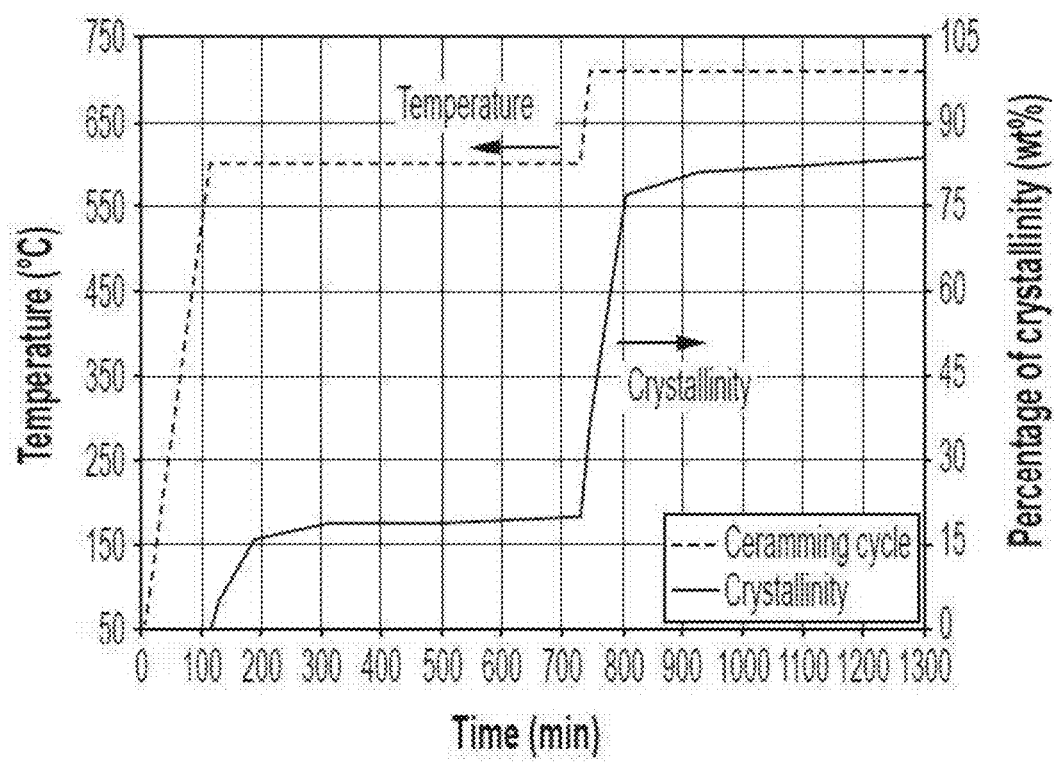
FIG. 4 is a plot of crystallinity changes as a function of ceramming time and temperature for Sample Composition 1.

The results of Example 1 are graphically provided in FIG. 4, which shows that by varying the holding time at the pre-nucleation and nucleation stages, a low level of crystallinity (up to 20 wt %) can be achieved. The presence of a crystalline phase up to 20 wt % may provide a pre-nucleated glass composition having a composition less than $10^{10}$ poise, which may be formed into a 3D shape. As stated previously in this disclosure, it is believed that the pre-nucleated glass composition may also maintain desired surface quality while minimizing distortion. Once passed the pre-nucleation stage, a sharp increase of crystallinity is observed. A high degree of crystallinity (greater than 20 wt %) may result in a high viscosity (above $10^{10}$ poise). At viscosities above $10^{10}$ poise, forming a 3D shape is challenging at temperature ranges below 800° C.

Example 2

In Example 2, the impact of crystallinity on viscosity was studied for precursor glass ("glass") of Composition 1 from Example 1, a pre-nucleated glass nucleated at 600° C. for 15 minutes ("600° C.-15 min"), pre-nucleated glass nucleated at 600° C. for 30 minutes ("600° C.-30 min"), and a fully-cerammed glass ceramic 600° C. for four hours and 710° C. for 4 hours ("600-4/+710-4"). In this example, the viscosity was measured using the parallel plate viscosity (PPV) method of ASTM C1351M-96(2012), which is used herein unless otherwise specified.

Figure 5:
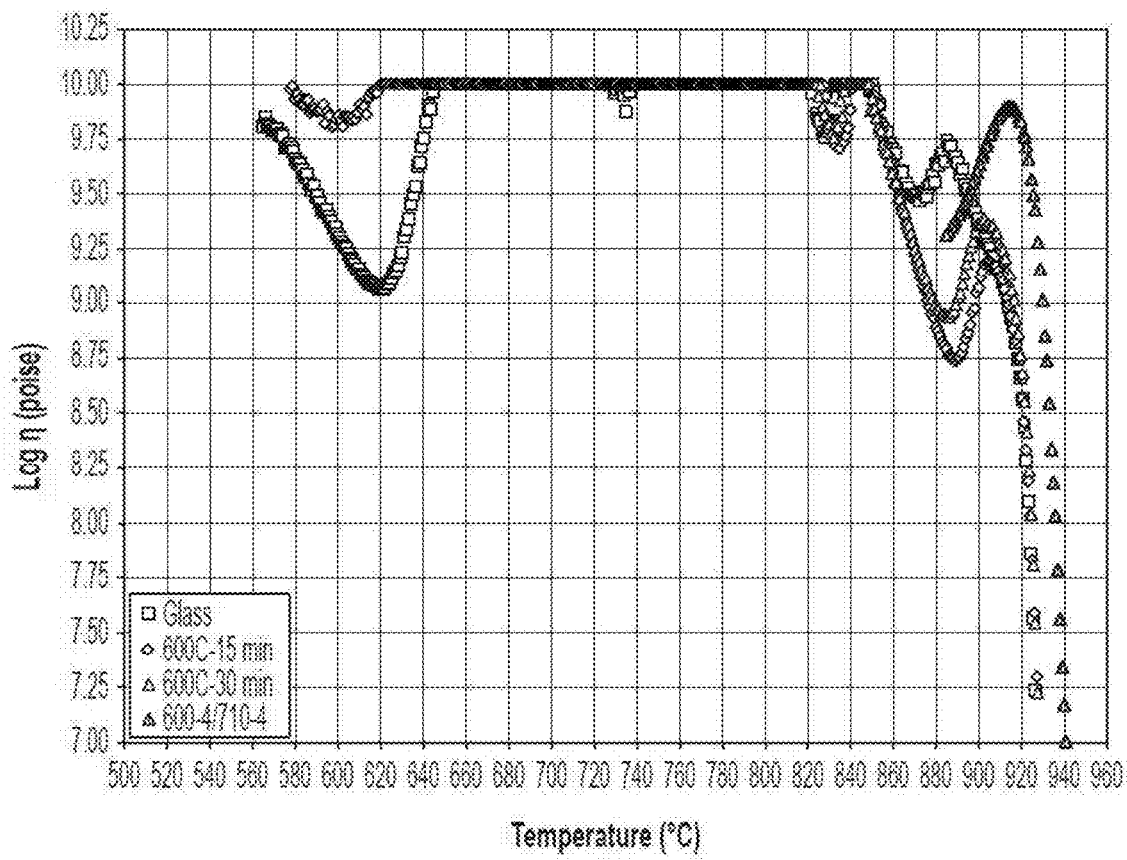
FIG. 5 is a plot of viscosity change as a function of temperature for precursor glass, pre-nucleated glasses, and a fully cerammed glass-ceramic.

The results of Example 2 are graphically provided in FIG. 5. As shown in FIG. 5, at temperatures below 800° C., the lowest viscosity ($10^9$ poise) was measured in a precursor glass. The second lowest viscosity ($10^{9.8}$ poise) was measured in a pre-nucleated glass (600° C.-15 min) with a low crystallinity (5 wt %). A further increased hold time at nucleation resulted in an increased crystallinity and hence a much higher viscosity, above $10^{10}$ poise, which is out of the measurement range for the PPV test.

Example 3

In Example 3, Sample Composition 1 was heated at a nucleation temperature of 600° C. for a 15 hour time period in a Lindberg/blue furnace to produce a pre-nucleated flat, rectangular sample. The pre-nucleated sample was then bent to a desired 3D shape using a single mold with a positive applied pressure of 60 psi and a vacuum assisted pressure of 12 inches Hg for 30 seconds. After being formed to its initial 3D shape, the pre-nucleated sample was positioned on its edge without any external support. The pre-nucleated sample was then heated using a cycle of 560° C. for 4 hours then 720° C. for 1 hour with a ramp rate of 5° C./min to produce a glass-ceramic article having a final 3D shape.

Figure 6A:
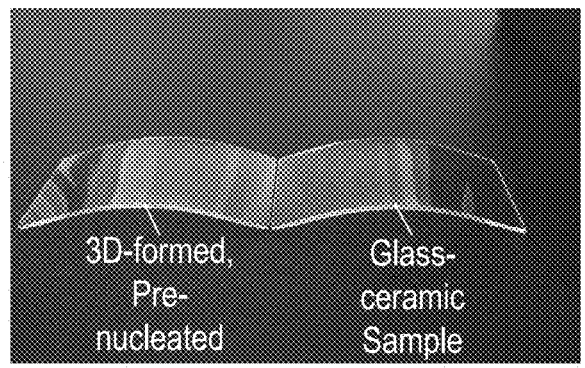
FIG. 6A is a photograph of as-formed and as-cerammed articles from Sample Composition 1.
Figure 6B:
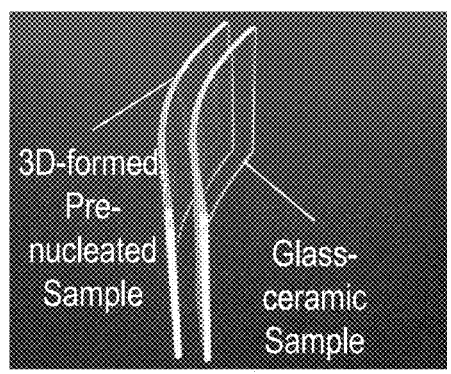
FIG. 6B is a photograph of as-formed and as-cerammed articles from Sample Composition 1.

The photographs of FIGS. 6A and 6B show the pre-nucleated samples after being formed to their initial 3D shape compared to the glass-ceramic article having a final 3D shape. FIGS. 6A and 6B show the pre-nucleated sample generally appeared to have maintained its surface quality and minimized distortion when compared to the glass-ceramic article. That is, the glass-ceramic article appeared to resemble the shape of the 3D formed pre-nucleated sample without noticeable surface distortion. (See FIGS. 6A and 6B). Additionally, as stated previously, due to the presence of crystallinity in the 3D-formed pre-nucleated sample, the sample was able to be cerammed while being supported by its own weight without requiring a supporting mold. It is believed that this mold-free ceramming method may be advantageous for reducing production costs—for example, by reducing or eliminating the cost of molds and by eliminating concerns regarding mold life.

Figure 7:
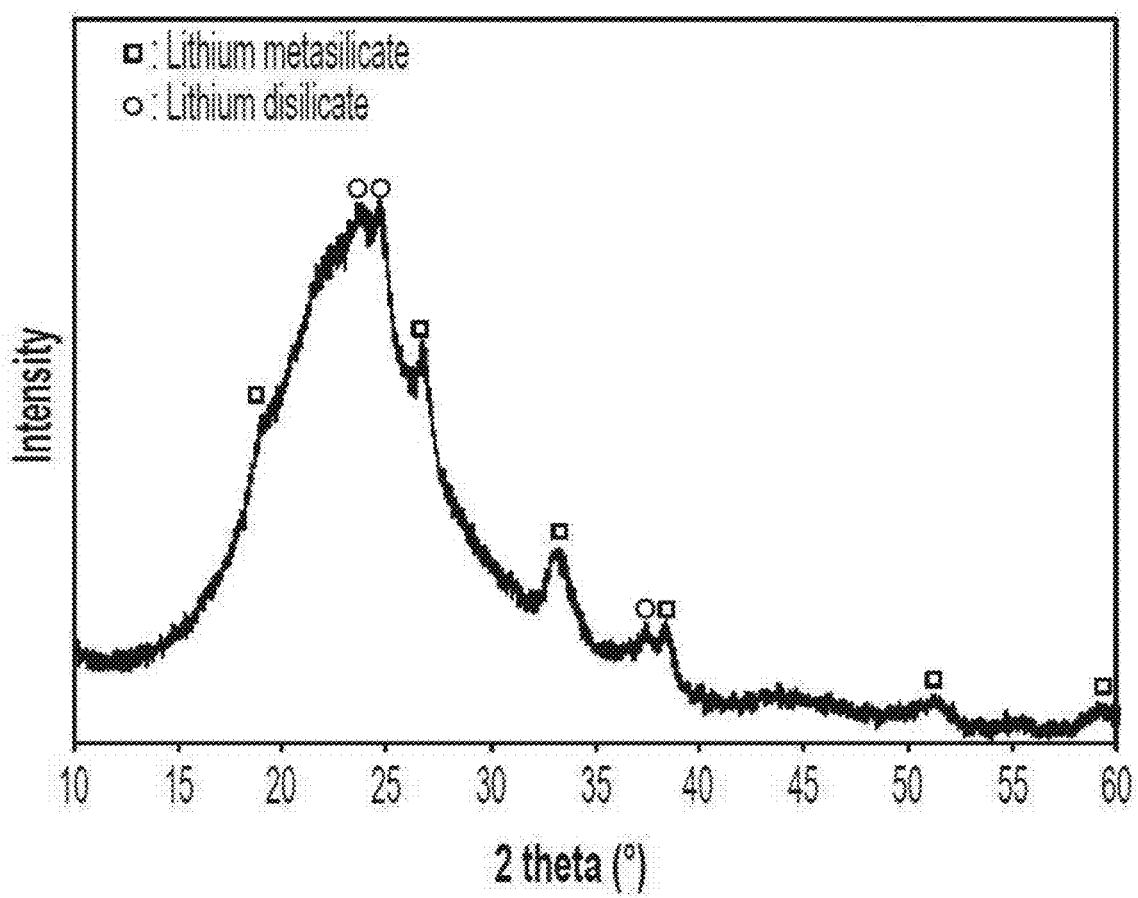
FIG. 7 is an XRD plot of the as-formed part and fully cerammed articles as shown in FIG. 3.
Figure 8:
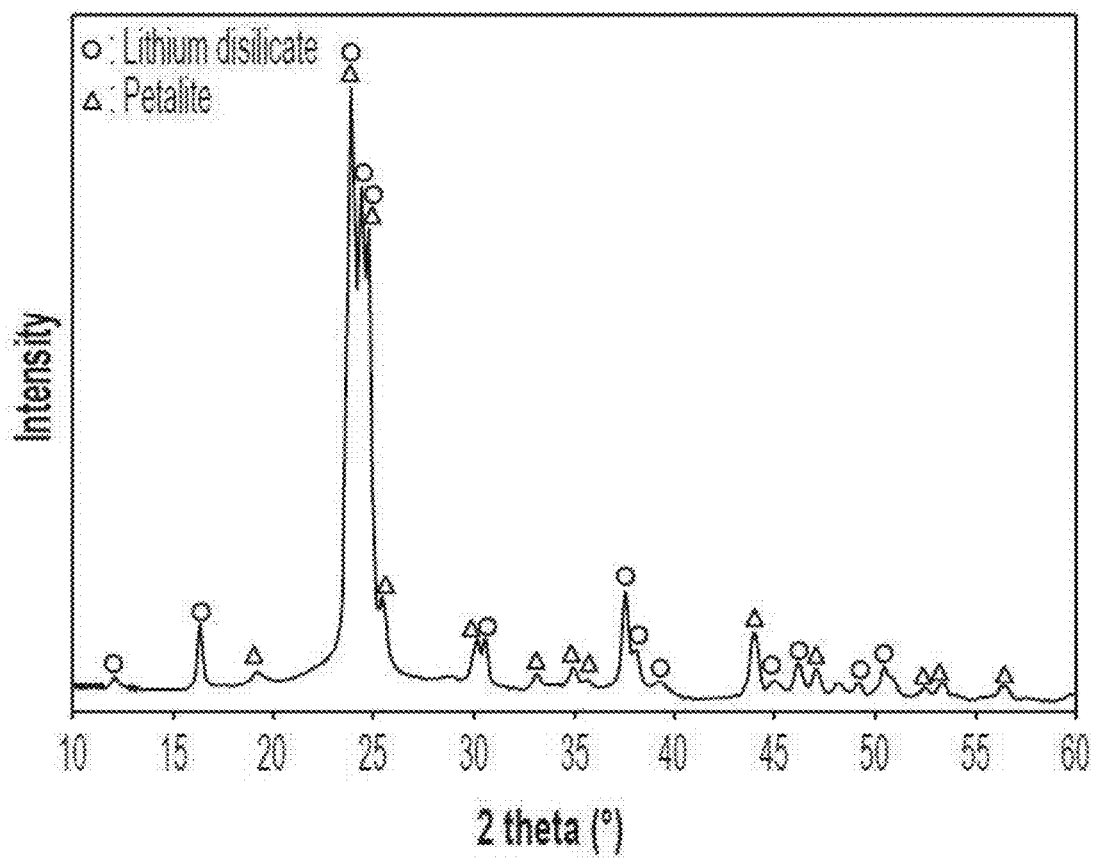
FIG. 8 is an XRD plot of the as-formed part and fully cerammed articles as shown in FIG. 3.

FIGS. 7 and 8 graphically depict the x-ray diffraction data for the 3D formed pre-nucleated sample and the glass-ceramic article having a final 3D shape, respectively. The 3D formed pre-nucleated sample of FIG. 7 included approximately 5 wt % crystalline phase, and the glass-ceramic article having a final 3D shape of FIG. 8 included approximately 100 wt % crystalline phase.

Example 4

Figure 9:
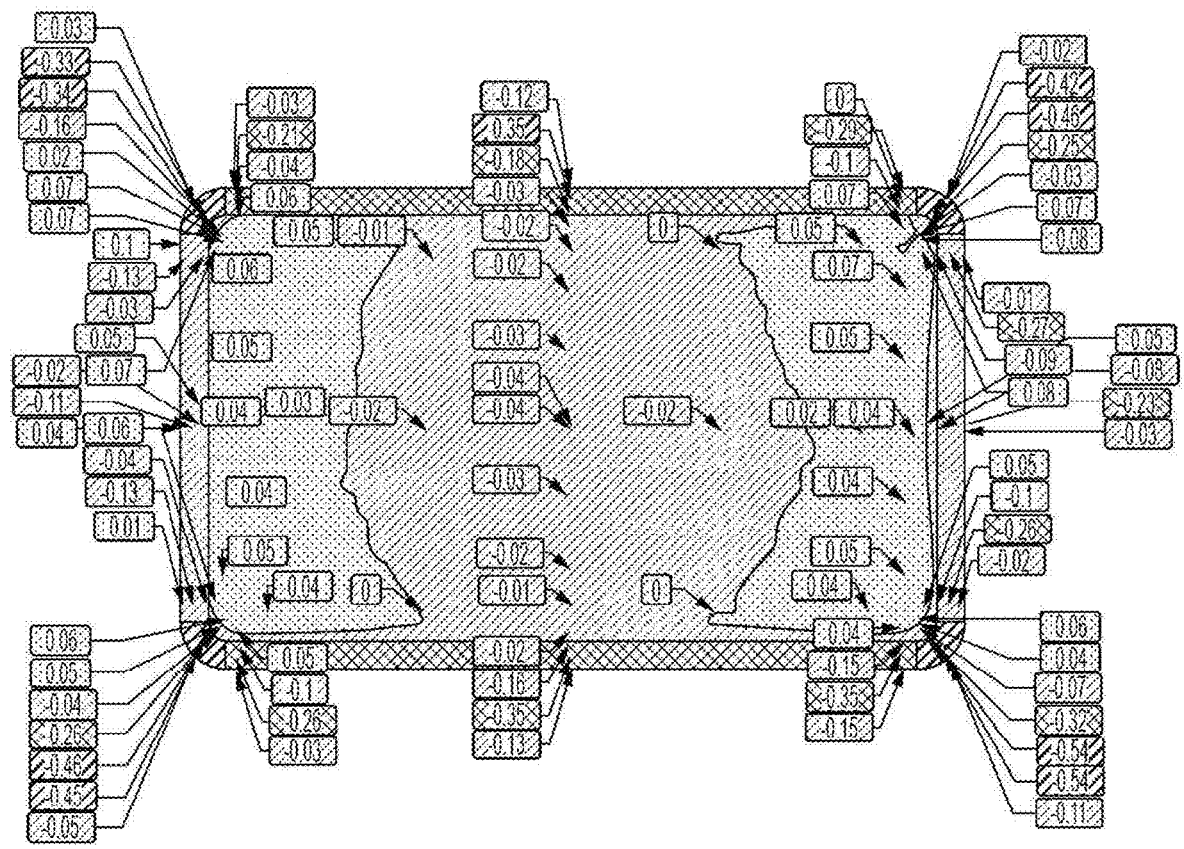
FIG. 9 is a best fit reference point of a 3D glass cover formed from a pre-nucleated (600° C.-15 min) preform of Sample Composition 1.
Figure 10:
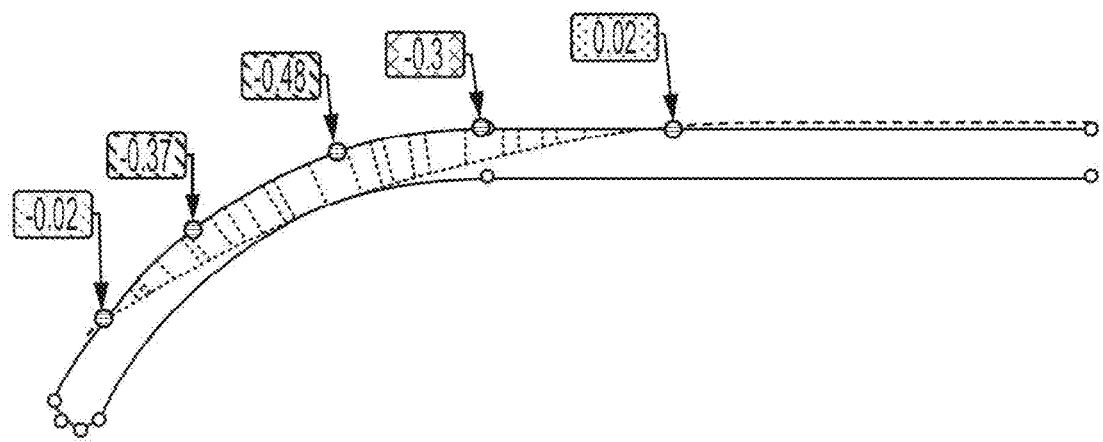
FIG. 10 is a best fit reference point of a 3D glass cover formed from a pre-nucleated (600° C.-15 min) preform of Sample Composition 1.

In Example 4, a 3D glass cover comprising Sample Composition 1 from Example 1 was 3D scanned and compared to the original design specifications. The shape of the 3D glass cover included a 2D surface (for interaction with a display) and a 3D surface (for wrapping around the edge of the display). FIG. 9 shows top-view of the 3D glass cover. FIG. 10 shows a side-view the 3D glass cover.

The 3D scanning was performed using an ATOS white light 3D scanner commercially-available from Capture 3D. To perform the 3D scan, a point cloud was obtained and analyzed using Geomagic XOV software and compared to a target CAD with the original design specifications. As shown in FIG. 9 and FIG. 10, the deviations from the target CAD are reported in units of millimeters.

Overall deviation represents max-min deviation from CAD, i.e. a difference between the lowest and the highest deviation from CAD for the entire 3D shape.

It will be apparent to those skilled in the art that various modifications and variations can be made without departing from the spirit or scope of the invention.

What is claimed is:

1. A method of forming a glass-ceramic article, the method comprising:
    pre-nucleating a precursor glass composition at a first nucleation temperature and maintaining the first nucleation temperature for a pre-nucleating time period to produce a pre-nucleated crystallizable glass composition, wherein the pre-nucleated crystallizable glass composition comprises 5 wt % to 20 wt % crystalline phase;
    cooling the pre-nucleated crystallizable glass composition;
    forming the pre-nucleated crystallizable glass composition into a pre-nucleated crystallizable glass composition with an initial three-dimensional (3D) shape;
    nucleating the pre-nucleated crystallizable glass composition with the initial 3D shape at a second nucleation temperature for a nucleating time period to produce a nucleated crystallizable glass composition;
    ceramming the nucleated crystallizable glass composition at a crystallization temperature and maintaining the crystallization temperature for a crystallization time period to produce the glass-ceramic article having a final 3D shape,
    wherein the glass-ceramic article has a dimensional control of the final 3D shape within 0.1 mm of an original design specification of the final 3D shape.

2. The method of claim 1, wherein pre-nucleating the precursor glass composition comprises heating the precursor glass composition to the first nucleation temperature and maintaining the first nucleation temperature for the pre-nucleating time period.

3. The method of claim 1, wherein the nucleated crystallizable glass composition comprises greater than 20 wt % crystalline phase.

4. The method of claim 1, wherein the pre-nucleated crystallizable glass composition has a viscosity from $10^8$ poise to $10^{9.9}$ poise at the first nucleation temperature for the pre-nucleating time period.

5. The method of claim 1, wherein the nucleated crystallizable glass composition has a viscosity greater than $10^{10}$ poise at the second nucleation temperature.

6. The method of claim 1, wherein the first nucleation temperature is from 500° C. to 650° C.

7. The method of claim 1, wherein the second nucleation temperature is from 500° C. to 750° C.

8. The method of claim 1, wherein forming the pre-nucleated crystallizable glass composition into the pre-nucleated crystallizable glass composition with the initial 3D shape occurs while heating the pre-nucleated crystallizable glass composition at the second nucleation temperature, where the second nucleating temperature is higher than the first nucleating temperature.

9. The method of claim 1, wherein forming the pre-nucleated crystallizable glass composition into the pre-nucleated crystallizable glass composition with the initial 3D shape occurs before nucleating the pre-nucleated crystallizable glass composition with the initial 3D shape.

10. The method of claim 1, wherein forming the pre-nucleated crystallizable glass composition with the initial 3D shape comprises one or more of a sagging process or a rolling process.

11. The method of claim 1, wherein the method further comprises cooling the glass-ceramic article from crystallization temperature to an intermediate temperature at a first cooling rate, and from the intermediate temperature to room temperature at a second cooling rate, wherein the first cooling rate is lower than the second cooling rate.

12. The method of claim 1, wherein cooling the pre-nucleated crystallizable glass composition to room temperature.

13. A method of forming a glass-ceramic article, the method comprising:
    positioning a pre-nucleated crystallizable glass sheet comprising 5 wt % to 20 wt % of a crystalline phase onto a molding apparatus;
    forming the pre-nucleated crystallizable glass sheet into a pre-nucleated crystallizable glass sheet with an initial three dimensional (3D) shape;
    nucleating the pre-nucleated crystallizable glass sheet with the initial 3D shape at a nucleation temperature for a nucleating time period to produce a nucleated crystallizable glass composition;
    ceramming the nucleated crystallizable glass composition to a crystallization temperature and maintaining the crystallization temperature for a crystallization time period to produce the glass-ceramic article having a final 3D shape; and
    cooling the glass-ceramic article from crystallization temperature to an intermediate temperature at a first cooling rate, and from the intermediate temperature to room temperature at a second cooling rate, wherein:
    the first cooling rate is lower than the second cooling rate, and
    the glass-ceramic has a dimensional control of the final 3D shape within 0.1 mm of an original design specification of the final 3D shape.

14. The method of claim 13, wherein the pre-nucleated crystallizable glass sheet has a viscosity from $10^{7.6}$ poise to $10^{9.9}$ poise during the forming into the initial 3D shape.

15. The method of claim 13, wherein forming the pre-nucleated crystallizable glass sheet with the initial 3D shape comprises one or more of sagging process and a rolling process.

16. The method of claim 13, wherein the nucleation temperature is from 500° C. to 750° C.

17. The method of claim 13, wherein the crystallization temperature is from 650° C. to 900° C.

18. The method of claim 13, wherein forming the pre-nucleated crystallizable glass sheet into the pre-nucleated crystallizable glass sheet with the initial 3D shape occurs simultaneously with nucleating the pre-nucleated crystallizable glass sheet with the initial 3D shape by heating the initial 3D shape to the nucleation temperature.

* * * * *